United States Patent
Uy et al.

(10) Patent No.: US 11,977,717 B2
(45) Date of Patent: May 7, 2024

(54) GUIDED USER INTERFACE (GUI) BASED SYSTEMS AND METHODS FOR REGIONIZING FULL-SIZE PROCESS PLANT DISPLAYS FOR RENDERING ON MOBILE USER INTERFACE DEVICES

(71) Applicant: FISHER-ROSEMOUNT SYSTEMS, INC., Round Rock, TX (US)

(72) Inventors: Cristopher Ian Sarmiento Uy, Metro Manila (PH); Ryan Gallardo Valderama, Cavite (PH); Dino Anton Yu, Manila (PH); Mariana Dionisio, Austin, TX (US); Daniel R. Strinden, Austin, TX (US); Mark J. Nixon, Thorndale, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 0 days.

(21) Appl. No.: 17/982,107

(22) Filed: Nov. 7, 2022

(65) Prior Publication Data
US 2023/0054938 A1 Feb. 23, 2023

Related U.S. Application Data

(62) Division of application No. 16/572,983, filed on Sep. 17, 2019, now Pat. No. 11,507,251.

(51) Int. Cl.
*G06F 3/0482* (2013.01)
*G05B 15/02* (2006.01)

(52) U.S. Cl.
CPC .......... *G06F 3/0482* (2013.01); *G05B 15/02* (2013.01); *G06F 2203/04803* (2013.01); *G06F 2203/04806* (2013.01)

(58) Field of Classification Search
CPC ......... G06F 3/0482; G06F 2203/04803; G06F 2203/04806; G06F 3/0481; G06F 3/04847;
(Continued)

(56) References Cited

U.S. PATENT DOCUMENTS 9,541,905 B2 1/2017 Nixon et al.
9,678,484 B2 6/2017 Nixon et al.
(Continued)

FOREIGN PATENT DOCUMENTS

| EP | 3156871 A1 | 4/2017 |
|---|---|---|
| GB | 2 568 584 A | 5/2019 |
| JP | 2003-208212 A | 7/2003 |

OTHER PUBLICATIONS

Search Report for Application No. GB2013794.9, dated Feb. 8, 2021.

*Primary Examiner* — Hien L Duong
(74) *Attorney, Agent, or Firm* — MARSHALL, GERSTEIN & BORUN LLP

(57) ABSTRACT

Graphical user interface (GUI) based systems and methods are disclosed for regionizing full-size process plant displays for rendering on mobile user interface devices. A regionizer application receives a full-size process plant display that graphically represents at least a portion of a process plant that includes graphic representations of a plurality of process plant entities. The regionizer app determines display region(s) of the full-size process plant display that define corresponding view portions of the full-size process plant display. The display regions are transmitted to a mobile user interface device for rendering by a mobile display navigation app. The GUI based systems and methods can also automatically detect graphical process control loop display portions within full-size process plant displays for rendering on mobile user interface devices. The GUI based systems
(Continued)

and methods can further refactor full-size process plant displays at various zoom and detail levels for visualization on mobile user interface devices.

16 Claims, 14 Drawing Sheets

(58) Field of Classification Search
CPC .................. G06F 3/0485; G05B 15/02; G05B 2219/32128; G05B 19/41885; G05B 23/0272; G05B 2219/31472; G05B 19/41875; G05B 2219/23051; G05B 2219/32368; G05B 19/418; H04M 1/72415; Y02P 90/02
See application file for complete search history.

(56) References Cited

U.S. PATENT DOCUMENTS

| | | | |
|---|---|---|---|
| 9,778,626 B2 | 10/2017 | Nixon et al. | |
| 10,031,489 B2 | 7/2018 | Nixon et al. | |
| 10,031,490 B2 | 7/2018 | Nixon et al. | |
| 10,133,243 B2 | 11/2018 | Nixon et al. | |
| 10,324,423 B2 | 6/2019 | Nixon et al. | |
| 10,387,100 B2 * | 8/2019 | Markov | A01B 76/00 |
| 2007/0132779 A1 * | 6/2007 | Gilbert | G06F 8/38 345/619 |
| 2011/0144777 A1 * | 6/2011 | Firkins | G05B 23/0272 700/83 |
| 2011/0230980 A1 * | 9/2011 | Hammack | G05B 19/409 700/17 |
| 2012/0019522 A1 | 1/2012 | Lawrence et al. | |
| 2014/0074273 A1 | 3/2014 | Mohideen et al. | |
| 2014/0273847 A1 | 9/2014 | Nixon et al. | |
| 2014/0274123 A1 * | 9/2014 | Nixon | H04L 67/12 455/456.1 |
| 2014/0277607 A1 | 9/2014 | Nixon et al. | |
| 2014/0277615 A1 | 9/2014 | Nixon et al. | |
| 2014/0277617 A1 | 9/2014 | Nixon et al. | |
| 2014/0277618 A1 | 9/2014 | Nixon et al. | |
| 2014/0282015 A1 | 9/2014 | Nixon et al. | |
| 2016/0042541 A1 * | 2/2016 | Nixon | G06T 11/206 345/440 |
| 2016/0132046 A1 | 5/2016 | Beoughter et al. | |
| 2017/0315697 A1 * | 11/2017 | Jacobson | H04L 12/281 |
| 2018/0109651 A1 | 4/2018 | Nixon et al. | |
| 2018/0131907 A1 * | 5/2018 | Schmirler | H04N 23/698 |
| 2021/0089192 A1 * | 3/2021 | Stark | G06F 3/04817 |

* cited by examiner

| MEASUREMENT PARAMETERS | | | |
|---|---|---|---|
| Measurement | Entity | Value | Note |
| Bottoms Flow Rate | FC701_03 | 1.44 MBPD | May flow to multiple destinations (e.g. T-721, T-722, T-723) |
| Bottoms Level | LC701_01 | 0.5 | |
| Lower Control Temperature | TC701_01 | 668 deg F | |
| Heater Control for Reboiler | FC701_01 | 1000 ft^3 / sec | |
| Bottoms Composition | AC701_01 | 0.5 | |

FIG. 6

GUIDED USER INTERFACE (GUI) BASED SYSTEMS AND METHODS FOR REGIONIZING FULL-SIZE PROCESS PLANT DISPLAYS FOR RENDERING ON MOBILE USER INTERFACE DEVICES

CROSS-REFERENCE TO RELATED APPLICATIONS

This application is a divisional of U.S. patent application Ser. No. 16/572,983, filed Sep. 17, 2019, entitled "Guided User Interface (GUI) Based Systems and Methods for Regionizing Full-Size Process Plant Displays for Rendering on Mobile User Interface Devices," the entire disclosure of which is hereby incorporated by reference herein.

FIELD OF THE DISCLOSURE

This disclosure relates generally to guided user interface (GUI) based systems and methods for rendering full-size process plant displays on mobile user interface devices, and, more particularly, to systems and methods for regionizing full-size process plant displays for rendering on mobile user interface devices; systems and methods for automatically detecting graphical process control loop display portions within full-size process plant displays for rendering on mobile user interface devices; and systems and methods for refactoring full-size process plant displays at various zoom and detail levels for visualization on mobile user interface devices.

BACKGROUND

Distributed process control systems, like those used in chemical, petroleum or other processes, typically include one or more process controllers and input/output (I/O) devices communicatively coupled to at least one host or operator interface and to one or more field devices via analog, digital or combined analog/digital buses, or via a wireless communication link or network. The field devices, which may be, for example, valves, valve positioners, switches, and transmitters (e.g., temperature, pressure, level and flow rate sensors), are located within the process environment and generally perform physical or process control functions, such as opening or closing valves, or measuring process parameters to control one or more processes executing within the process plant or system. Smart field devices, such as field devices conforming to the well-known Fieldbus protocol may also perform control calculations, alarming functions, and other control functions commonly implemented within a controller. The process controllers, which are also typically located within the plant environment, receive signals indicative of process measurements made by sensors or field devices and/or other information pertaining to the field devices and execute a controller application that runs, for example, different control modules that make process control decisions, generate control signals based on the received information, and coordinate with the control modules or blocks being performed in the field devices, such as HART®, Wireless HART®, and FOUNDATION® Fieldbus field devices. The control modules in the controller send the control signals over the communication lines or links to the field devices to thereby control the operation of at least a portion of the process plant or system.

Information from the field devices and the controller is usually made available over a data highway to one or more other hardware devices, such as operator interfaces, personal computers, or computing devices, data historians, report generators, centralized databases, or other centralized administrative computing devices that are typically, but not always, placed in control rooms or other locations away from the harsher plant environment. Each of these hardware devices typically, though not always, is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers, and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. Each of these applications provides a user-interface (UI) to allow a user (e.g., a configuration engineer, an operator, a maintenance technician, etc.) to view and/or modify aspects of the process plant operation and configuration. Throughout this specification, the phrase "user interface," "UI," and/or guided user interface (GUI) is used to refer to an application or screen that allows a user to view or modify the configuration, operation, or status of the process plant. Similarly, the phrase "user-interface device," "UI device," and/or "GUI device" is used to refer to a device on which a user interface is operating, whether that device is stationary (e.g., a workstation, wall-mounted display, process control device display, etc.) or mobile (e.g., a laptop computer, tablet computer, smartphone, etc.). A configuration application, which resides in one or more operator workstations or computing devices, enables users to create or change process control modules and download these process control modules via a data highway to dedicated distributed controllers. Typically, these control modules are made up of communicatively interconnected function blocks, which perform functions within the control scheme based on inputs thereto and which provide outputs to other function blocks within the control scheme. The configuration application may also allow a configuration engineer to create or change operator interfaces that are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system engineers, operators, or users using the UIs, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

As noted above, operator display applications are typically implemented on a system wide basis in one or more of the workstations and provide displays to the operator or maintenance persons regarding the operating state of the control system or the devices within the plant. Typically, these displays take the form of alarming displays that receive alarms generated by controllers or devices within the process plant, control displays indicating the operating state of the controllers and other devices within the process plant, maintenance displays indicating the operating state of the devices within the process plant, etc. These displays are generally configured to display, in known manners, information or data received from the process control modules or the devices within the process plant. In some known systems, displays have a graphic associated with a physical or logical element that is communicatively tied to the physical or logical element to receive data about the physical or logical element. The graphic may be changed on the display screen based on the received data to illustrate, for example, that a tank is half full, to illustrate the flow measured by a flow sensor, etc.

In known implementations, UIs may be configured to display graphical representations of a process plant, or portions thereof, and, are generally referred to as "process displays." Process displays are typically designed to be viewed on large screen surfaces, such standard 21- or 27-inch monitors having a 16:9 aspect ratio. As a result, process displays are generally configured for large screen surfaces and generally include large amounts of graphics and information associated with the process plant. For example, a single process display may contain a large amount of graphics and information regarding one or more processes operating within the process plant. These processes are generally maintained and controlled by control modules of the process plant. Control modules, in turn, generate or otherwise provide vital information about the processes, such as process values, alarm information, and other diagnostic information regarding the operational status of the process plant.

A problem arises, however, when presenting or otherwise providing large process displays to small screen devices, such as mobile phones and tablets. Presenting process displays, originally configured for a large process display, on a small surface screen device typically results in difficulties to plant operators in locating plant-specific information, especially in emergency situations, such as an emergency involving an active alarm. For example, with a small surface device, only a small subset of visualizations may be rendered on a screen at given time. The operator's effectivity is reduced if he or she has to locate the needed visualization. Moreover, small screen devices generally have limited processing and memory capacities, making rendering the large process displays on such devices infeasible.

Moreover, provision of standard of standard UI gestures, such as pan and zoom, for navigating within the process display typically does not solve the issue. This is especially so for more detailed and/or large scale process displays that can have numerous control modules, fields devices, or other process plant entities, each with their own detailed measures and values, many of which are constantly changing. Operating such large process displays on small screen device would require user to constantly zoom and pan to locate and read values that they need at that time. This not only creates inefficiencies but also creates poor situational awareness among plant operators who rely on mobile devices to monitor the process plant. For these reasons, this can also create dangerous situations with the process plant. For example, because process displays rendered on small screens are not always completely visible and/or because of the physical (e.g., processing and memory limitations of mobile devices), it is commonplace for an operator to fail to see an alarm, or for a mobile device to adequately notify an operator, of a value that has reached a critical threshold. Failure to discover these critical readings can result in damage to process plant or injury to operators, personnel, or other assets within the process plant.

For the foregoing reasons, there is a need for systems and methods for regionizing full-size process plant displays for rendering on mobile user interface devices.

In addition, for the foregoing reasons, there is a further need for systems and methods for automatically detecting graphical process control loop display portions within full-size process plant displays for rendering on mobile user interface devices.

In addition, for the foregoing reasons, there is a further need for systems and methods for refactoring full-size process plant displays at various zoom and detail levels for visualization on mobile user interface devices.

SUMMARY

The disclosure of the present application generally describes embodiments of systems and methods for rendering large process displays, or portions bounded or generated therefrom, on a small surface devices, such as mobile user interface devices, in an efficient and effective manner. The disclosure of the present application overcomes the problems of the prior art by describing efficient resource usage (e.g., processor and memory usage) and visualization system and methods for determining and rendering display regions, view portions, and other graphical representations of a large process display on small screen devices having small surface areas.

For example, as disclosed for various embodiments, the systems and methods of the present application solve the problem of presenting large process displays on small screen devices (e.g., mobile user interface devices) through new graphical determination, detection, and rendering techniques that allow operators to view large displays on small surfaces while attempting to maintain or at least reduce the impact on situational awareness. In various embodiments, the systems and methods as described by the present application determine and render graphics and displays for small screen devices without the need for a graphics developer or computer programmer to develop new code, graphics, or displays, graphics for small screen devices. That is, instead of a graphics developer or computer programmer reworking, redesigning, and/or maintaining a new set of process displays configured for small screen devices, the systems and methods described herein automatically take large process displays, originally designed for full-size display screens of a process plant, and regionize, refactor, and/or auto-introspect the full-size display screens, as described herein, to determine select graphical display regions and view portions of the full-size display screens to render on the small screen devices.

Moreover, because the systems and method described herein are configured for operating with existing process displays (e.g., large process displays), the systems and methods described herein may augment existing UI products typically used in process plants, for example, DeltaV Mobile as provided by Emerson Process Management.

Accordingly, in various embodiments disclosed herein, graphical user interface (GUI) based systems and methods are disclosed for regionizing full-size process plant displays for rendering on mobile user interface devices. The GUI based systems and methods may include receiving, at a regionizer application (app) executing on one or more processors, a full-size process plant display that graphically represents at least a portion of a process plant. The full-size process plant display may include graphic representations of a plurality of process plant entities within the process plant. The full-size process plant display may comprise a GUI adapted for rendering on a full-size display screen of the process plant. The GUI based systems and methods may further include determining, by the regionizer app, one or more display regions of the full-size process plant display. Each of the one or more display regions may define a view portion of the full-size process plant display. In addition, each of the one or more display regions may include at least one graphical representation of a process plant entity selected from the plurality of process plant entities. The GUI based systems and methods may further include transmitting, by the one or more processors, the one or more display regions to a mobile user interface device. The mobile user interface device may execute a mobile display navigation app. The mobile display navigation app may render each of the one or more display regions on a display screen of the mobile user interface device, where the display screen of the mobile user interface device comprises a surface area that is less than a full-size surface area of the full-size display screen.

In additional embodiments disclosed herein, GUI based systems and methods are disclosed for automatically detecting graphical process control loop display portions within full-size process plant displays for rendering on mobile user interface devices. The GUI based systems and methods may include receiving, at a display auto-introspection routine executing on one or more processors, a full-size process plant display that graphically represents at least a portion of a process plant. The full-size process plant display may include graphic representations of a plurality of process plant entities within the process plant. In addition, the full-size process plant display may comprise a GUI adapted for rendering on a full-size display screen of the process plant. The GUI based systems and methods may further include automatically detecting, by the display auto-introspection routine, a graphical process control loop display portion depicted within the full-size process plant display. The graphical process control loop display portion may include graphical representations of one or more process plant entities selected from the plurality of process plant entities. The GUI based systems and methods may further include generating, by the one or more processors, a selectable display list representing the one or more process plant entities depicted within the graphical process control loop display portion. The GUI based systems and methods may further include transmitting, by the one or more processors, the graphical process control loop display portion and the selectable display list to a mobile user interface device. In various embodiments, the mobile user interface device may execute a mobile display navigation app. The GUI based systems and methods may further include rendering, by the mobile display navigation app, the selectable display list within a first area of a display screen of the mobile user interface device. In addition, the GUI based systems and methods may further include rendering, by the mobile display navigation app, the graphical process control loop display portion within a second area of the display screen of the mobile user interface device. In various embodiments, the mobile display navigation app may be adapted to, upon receiving a selection from the selectable display list corresponding to a particular process plant entity of the or more process plant entities, adjust a zoom level to focus the particular process plant entity within the graphical process control loop display portion as displayed in the second area of the display screen of the mobile user interface device.

In additional embodiments disclosed herein, GUI based systems and methods are disclosed for refactoring full-size process plant displays at various zoom and detail levels for visualization on mobile user interface devices. The GUI based systems and methods may include transmitting, by one or more processors, a full-size process plant display to a mobile user interface device. The full-size process plant display may graphically represent at least a portion of a process plant. In addition, the full-size process plant display may include graphic representations of a plurality of process plant entities within the process plant. In various embodiments, the full-size process plant display may be a GUI adapted for rendering on a full-size display screen of the process plant. The GUI based systems and methods may further include rendering, by a mobile display navigation app executing on a processor of the mobile user interface device, a first view portion of the full-size process plant display on a display screen of the mobile user interface device. The first view portion may define a first zoom level and a first detail level of a process plant entity selected from the plurality of process plant entities. In various embodiments, the display screen of the mobile user interface device may comprise a surface area that is less than a full-size surface area of the full-size display screen. The GUI based systems and methods may further include receiving, at the mobile display navigation app, a gesture command corresponding to a user manipulation of the surface area of the mobile user interface device. The GUI based systems and methods may further include rendering, by a mobile display navigation app upon receiving the gesture command, a second view portion of the full-size process plant display on the display screen of the mobile user interface device. The second view portion may define a second zoom level and a second detail level of the process plant entity. In various embodiments, the first zoom level may differ from the second zoom level, and/or the first detail level may differ from the second detail level.

In accordance with the above, and with the disclosure herein, the present disclosure includes improvements in computer functionality or in improvements to other technologies. That is, the present disclosure describes improvements in the functioning of the computer itself or "any other technology or technical field" because only needed view portions of the related display region would need be shown on display screens of the mobile UI device. This would reduce the processing resources required by a mobile UI device. In addition, the improvement described herein decrease computer network payload and traffic as the full-size process displays (at least in some embodiments) need not be transferred over a network backbone. Further, the GUI based systems and methods for refactoring full-size process plant displays at various zoom and detail levels improves the performance of mobile user interface devices by allowing the user interface device to render fewer visualizations and/or graphics thereby improving the performance of the user interface device by reducing the required processing power and memory usage required by a user interface device.

In addition, present disclosure relates to improvement to other technologies or technical fields at least because, in general, determination and/or adjustment of the display regions provides an end user of mobile display navigation application, as described herein, with an experience that the display regions are "custom built" for their respective mobile user interface devices, and without a computer programmer or designer needing to create and/or maintain additional process displays for each of the display regions. In addition, in some embodiments, the process modules may be rendered, e.g., by mobile display navigation app, in a scrollable list format. In further embodiment, visualization related to alarm information may be rendered in a scrollable list format. In this way, display auto-introspection assists operators maintain or even increase operational awareness even on small surfaces. For example, in embodiments implementing the display auto-introspection routine, by analyzing full-size process plant display to determine visualizations of process modules as graphical process control loop display portions, exposes valuable information (e.g. measurement parameters) may be exposed to operators of the process plant. In addition, this also allows operators to quickly and efficiently navigate to the value information on a display, e.g., where tapping on an item in a selectable display list will automatically zoom the display to the visualization in the display.

The present disclosure includes applying the certain of the claim elements with, or by use of, a particular machine, e.g., a user may adjust any of graphical detail, measurement parameter detail on the screen where the current zoom level corresponds to the current detail level of information displayed on a display screen of a mobile UI device. A user of a mobile user interface device may thus view process or alarm information on display screen that is native within a process control system in an efficient manner on a mobile user interface device having a small screen. In addition, the process plant entities of the process plant may be configured from the mobile UI device. For example, configuration options, e.g., by a configuration command, allows a user or program application to select areas of an operator graphic that would automatically appear as scrollable pages on a mobile device. The areas are selectable in sizes that mirror sizes and resolutions of phone and tablet screens, and when a mobile device initiates a browser or native mobile app, the screen size of the mobile device app may be automatically detected, and the graphics may be rendered in a resolution and/or size that matches the mobile device.

In addition, the present disclosure includes effecting a transformation or reduction of a particular article to a different state or thing, e.g., a command that may be sent to a server of the process plant to adjust or modify a parameter of a process plant entity. In this way monitoring and control of a process plant is feasible on a small screen device such mobile user interface device as describe herein.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

FIG. 6 is a listing of example measurement parameters of the one or more process plant entities of FIGS. 5A and 5B;

DETAILED DESCRIPTION

Figure 1A:
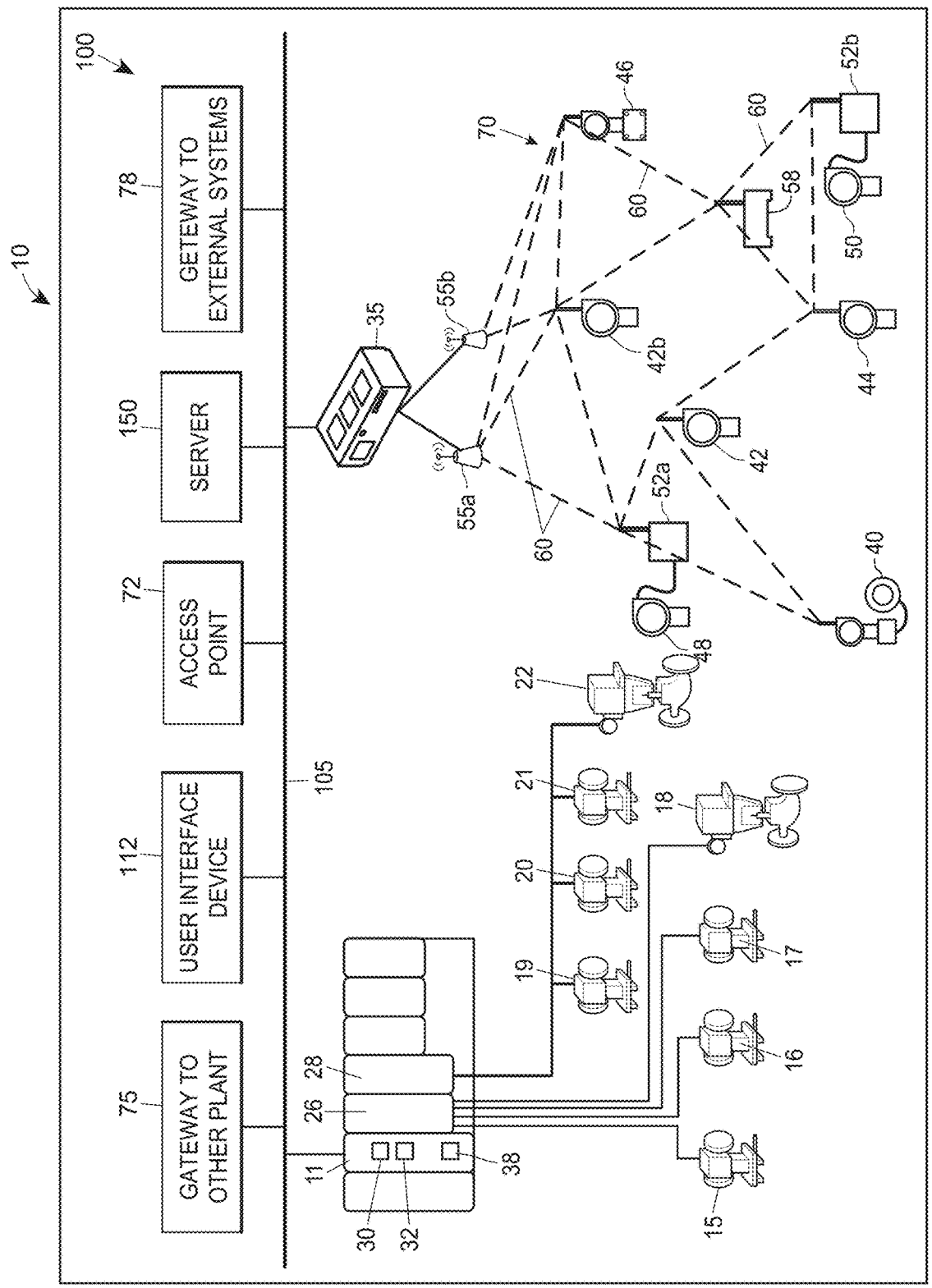
FIG. 1A is a block diagram of an exemplary process control network operating in a process control system or process plant as described in various embodiments herein.

FIG. 1A is a block diagram of an exemplary process control network 100 operating in a process control system or process plant 10 as described in various embodiments herein. The process control network 100 may include a network backbone 105 providing connectivity directly or indirectly, and/or wired or wirelessly, between a variety of other devices. The devices coupled to the network backbone 105 include, in various embodiments, combinations of access points 72, gateways 75 to other process plants (e.g., via an intranet or corporate wide area network), gateways 78 to external systems (e.g., to the Internet), UI devices 112 which may be stationary (e.g., a traditional operator workstation) or mobile computing devices (e.g., a mobile device, table, mobile phone, smart-phone, etc.), servers 150, controllers 11, input/output (I/O) cards 26 and 28, wired field devices 15-22, wireless gateways 35, and wireless communication networks 70. The communication networks 70 may include wireless devices 40-58, which include wireless field devices 40-46, wireless adapters 52a and 52b, access points 55a and 55b, and a router 58. The wireless adapters 52a and 52b may be connected to non-wireless field devices 48 and 50, respectively. The controller 11 may include a processor 30, a memory 32, and one or more control routines 38. Though FIG. 1A depicts only a single one of some of the devices connected to the network backbone 105, it will be understood that each of the devices could have multiple instances on the network backbone 105 and, in fact, that the process plant 10 may include multiple network backbones 105.

The UI devices 112 may be communicatively connected to the controller 11 and the wireless gateway 35 via the network backbone 105. The controller 11 may be communicatively connected to wired field devices 15-22 via input/output (I/O) cards 26 and 28 and may be communicatively connected to wireless field devices 40-46 via the network backbone 105 and a wireless gateway 35. The controller 11 may operate to implement a batch process or a continuous process using at least some of the field devices 15-22 and 40-46. The controller 11, which may be, by way of example, the DeltaV™ controller sold by Emerson Process Management, is communicatively connected to the process control network backbone 105. The controller 11 may be also communicatively connected to the field devices 15-22 and 40-46 using any desired hardware and software associated with, for example, standard 4-20 mA devices, I/O cards 26, 28, and/or any smart communication protocol such as the FOUNDATION® Fieldbus protocol, the HART® protocol, the Wireless HART® protocol, etc. In the embodiment illustrated in FIG. 1A, the controller 11, the field devices 15-22 and the I/O cards 26, 28 are wired devices, and the field devices 40-46 are wireless field devices.

In operation of the UI device 112, the UI device 112 may, in some embodiments, execute a user interface ("UI"), allowing the UI device 112 to accept input via an input interface and provide output at a display. The UI device 112 may receive data (e.g., process related data such as process parameters, log data, sensor data, and/or any other data that may be captured and stored), from the server 150. Server 150 may comprise one or more processors and/or memories for executing instructions, implementing software, otherwise implementing or invoking the flow diagrams, methods, or other aspects disclosed herein. In some embodiments, server 150 may be part of or located within process plant 10. In other embodiments, server 150 may be a server, such as a cloud server, external to process plant 10. For example, server 150 may be a third-party cloud server such as a Microsoft Azure based cloud server, an Amazon Web Services (AWS) server, or the like.

In other embodiments, the UI may be executed, in whole or in part, at the server 150, where the server 150 may transmit display data to the UI device 112. The UI device 112 may receive UI data (which may include display data and process parameter data) via the backbone 105 from other nodes in the process control network 100, such as the controller 11, the wireless gateway 35, or the server 150. Based on the UI data received at the UI device 112, the UI device 112 provides output (i.e., visual representations or graphics) representing aspects of the process associated with the process control network 100, allowing the user to monitor the process. The user may also affect control of the process by providing input at the UI device 112. To illustrate, the UI device 112 may provide graphics representing, for example, a tank filling process. In such a scenario, the user may read a tank level measurement and decide that the tank needs to be filled. The user may interact with an inlet valve graphic displayed at the UI device 112 and input a command causing the inlet valve to open.

In certain embodiments, the UI device 112 may implement any type of client, such as a thin client, web client (e.g., via a browser), or thick client. For example, the UI device 112 may depend on other nodes, computers, UI devices, or servers for the bulk of the processing necessary for operation of the UI device 112, as might be the case if the UI device is limited in memory, battery power, etc. (e.g., in a wearable device). In such an example, the UI device 112 may communicate with the server 150 or with another UI device, where the server 150 or other UI device may communicate with one or more other nodes (e.g., servers) on the process control network 100 and may determine graphics, display data and/or process data to transmit to the UI device 112. Furthermore, the UI device 112 may pass any data related to received user input to the server 150 so that the server 150 may process the data related to user input and operate accordingly. In other words, the UI device 112 may do little more than render graphics and act as a portal to one or more nodes or servers that store the data and execute the routines necessary for operation of the UI device 112. A thin client UI device offers the advantage of minimal hardware requirements for the UI device 112. A thin client UI may be implemented via a browser, which may be a web browser application, to render various displays or GUIs as described herein.

In various embodiments, the UI device 112 may be a web client. In such an embodiment, a user of the UI device 112 may interact with the process control system via control unit 94 or mobile display navigation app 95 of the UI device 112. Control unit 94 and/or mobile display navigation app 95 enables the user to access data and resources at another node or server 150 (such as the server 150) via the backbone 105. For example, mobile display navigation app 95 may be a web browser that may receive and render graphics/UI data, such as display data or process parameter data, from the server 150, allowing mobile display navigation app 95 to depict graphics used for controlling and/or monitoring some or all of the process. Mobile display navigation app 95 (e.g., acting as a browser) may also receive user input (such as a mouse click or gesture command on a graphic). The user input may cause mobile display navigation app 95 to retrieve or access an information resource stored on the server 150. For example, the mouse click or gesture command may cause mobile display navigation app 95 to retrieve (from the server 150) and display information pertaining to the clicked or otherwise manipulated graphic.

In yet other embodiments, the bulk of the processing for the UI device 112 may take place at the UI device 112. For example, the UI device 112 may execute the previously discussed UI. The UI device 112 may also store, access, and analyze data locally.

In operation, a user may interact with the UI device 112 to monitor or control one or more devices in the process control network 100, such as any of the field devices 15-22 or the devices 40-48. The user may interact with the UI device 112, for example, to modify or change a parameter associated with a control routine stored in the controller 11. The processor 30 of the controller 11 implements or oversees one or more process control routines (stored in a memory 32), which may include control loops. The processor 30 may communicate with the field devices 15-22 and 40-46 and with other nodes that are communicatively connected to the backbone 105. It should be noted that any control routines or modules (including quality prediction and fault detection modules or function blocks) described herein may have parts thereof implemented or executed by different controllers or other devices if so desired. Likewise, the control routines or modules described herein which are to be implemented within the process control system may take any form, including software, executable instructions, firmware, hardware, etc. Control routines may be implemented in any desired software format, such as using object oriented programming, ladder logic, sequential function charts, function block diagrams, or using any other software programming language or design paradigm. In particular, the control routines may be implemented by a user through the UI device 112. The control routines may be stored in any desired type of memory, such as random access memory (RAM), or read only memory (ROM). Likewise, the control routines may be hard-coded into, for example, one or more EPROMs, EEPROMs, application specific integrated circuits (ASICs), or any other hardware or firmware elements. Thus, the controller 11 may be configured (by a user using a UI device 112 in certain embodiments) to implement a control strategy or control routine in any desired manner.

In some embodiments of the UI device 112, a user may interact with the UI device 112 to implement a control strategy at the controller 11 using what are commonly referred to as function blocks, wherein each function block is an object or other part (e.g., a subroutine) of an overall control routine and operates in conjunction with other function blocks (via communications called links) to implement process control loops within the process control system. Control based function blocks typically perform one of an input function, such as that associated with a transmitter, a sensor or other process parameter measurement device; a control function, such as that associated with a control routine that performs PID, fuzzy logic, etc. control; or an output function which controls the operation of some device, such as a valve, to perform some physical function within the process control system. Of course, hybrid and other types of function blocks exist. The function blocks may have graphical representations that are provided at the UI device 112, allowing a user to easily modify the types of function blocks, the connections between the function blocks, and the inputs/outputs associated with each of function blocks implemented in the process control system. Function blocks may be stored in and executed by the controller 11, which is typically the case when these function blocks are used for, or are associated with standard 4-20 mA devices and some types of smart field devices such as HART devices, or may be stored in and implemented by the field devices themselves, which can be the case with Fieldbus devices. The controller 11 may include one or more control routines 38 that may implement one or more control loops. Each control loop is typically referred to as a control module, and may be performed by executing one or more of the function blocks.

Referring still to FIG. 1A, the wireless field devices 40-46 communicate in a wireless network 70 using a wireless protocol, such as the Wireless HART protocol. In certain embodiments, the UI device 112 may be capable of communicating with the wireless field devices 40-46 using the wireless network 70. Such wireless field devices 40-46 may directly communicate with one or more other nodes of the process control network 100 that are also configured to communicate wirelessly (using the wireless protocol, for example). To communicate with one or more other nodes that are not configured to communicate wirelessly, the wireless field devices 40-46 may utilize a wireless gateway 35 connected to the backbone 105. Of course, the field devices 15-22 and 40-46 could conform to any other desired standard(s) or protocols, such as any wired or wireless protocols, including any standards or protocols developed in the future.

The wireless gateway 35 is an example of a provider device that may provide access to various wireless devices 40-58 of a wireless communication network 70. In particular, the wireless gateway 35 provides communicative coupling between the wireless devices 40-58 and other nodes of the process control network 100 (including the controller 11 of FIG. 1A). The wireless gateway 35 provides communicative coupling, in some cases, by the routing, buffering, and timing services to lower layers of the wired and wireless protocol stacks (e.g., address conversion, routing, packet segmentation, prioritization, etc.) while tunneling a shared layer or layers of the wired and wireless protocol stacks. In other cases, the wireless gateway 35 may translate commands between wired and wireless protocols that do not share any protocol layers.

Similar to the wired field devices 15-22, the wireless field devices 40-46 of the wireless network 70 may perform physical control functions within the process plant 10, e.g., opening or closing valves or take measurements of process parameters. The wireless field devices 40-46, however, are configured to communicate using the wireless protocol of the network 70. As such, the wireless field devices 40-46, the wireless gateway, and other wireless nodes 52-58 of the wireless network 70 are producers and consumers of wireless communication packets.

In some scenarios, the wireless network 70 may include non-wireless devices. For example, a field device 48 of FIG. 1A may be a legacy 4-20 mA device and a field device 50 may be a traditional wired HART device. To communicate within the network 70, the field devices 48 and 50 may be connected to the wireless communication network 70 via a wireless adaptor (WA) 52a or 52b. Additionally, the wireless adaptors 52a, 52b may support other communication protocols such as Foundation® Fieldbus, PROFIBUS, DeviceNet, etc. Furthermore, the wireless network 70 may include one or more network access points 55a, 55b, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communication network 70. The wireless devices 32-46 and 52-58 may communicate with each other and with the wireless gateway 35 over wireless links 60 of the wireless communication network 70.

In certain embodiments, the process control network 100 may include other nodes connected to the network backbone 105 that communicate using other wireless protocols. For example, the process control network 100 may include one or more wireless access points 72 that utilize other wireless protocols, such as WiFi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radio communication Sector) compatible protocols, short-wavelength radio communications such as near field communications (NFC) and Bluetooth, or other wireless communication protocols. Typically, such wireless access points 72 allow handheld or other portable computing devices to communicate over a respective wireless network that is different from the wireless network 70 and that supports a different wireless protocol than the wireless network 70. In some embodiments, the UI device 112 communicates over the process control network 100 using a wireless access point 72. In some scenarios, in addition to portable computing devices, one or more process control devices (e.g., controller 11, field devices 15-22, or wireless devices 35, 40-58) may also communicate using the wireless network supported by the access points 72.

Additionally or alternatively, the provider devices may include one or more gateways 75, 78 to systems that are external to the immediate process control system. In such embodiments, the UI device 112 may be used to control, monitor, or otherwise communicate with said external systems. Typically, such systems are customers or suppliers of information generated or operated on by the process control system. For example, a plant gateway node 75 may communicatively connect the immediate process plant 10 (having its own respective process control data network backbone 105) with another process plant having its own respective network backbone. In an embodiment, a single network backbone 105 may service multiple process plants or process control environments.

In another example, the plant gateway node 75 may communicatively connect the immediate process plant to a legacy or prior art process plant that does not include a process control network 100 or backbone 105. In this example, the plant gateway node 75 may convert or translate messages between a protocol utilized by the process control big data backbone 105 of the plant 10 and a different protocol utilized by the legacy system (e.g., Ethernet, Profibus, Fieldbus, DeviceNet, etc.). In such an example, the UI device 112 may be used to control, monitor, or otherwise communicate with systems or networks in said legacy or prior art process plant.

The provider devices may include one or more external system gateway nodes 78 to communicatively connect the process control network 100 with the network of an external public or private system, such as a laboratory system (e.g., Laboratory Information Management System or LIMS), a personnel rounds database, a materials handling system, a maintenance management system, a product inventory control system, a production scheduling system, a weather data system, a shipping and handling system, a packaging system, the Internet, another provider's process control system, or other external systems. The external system gateway nodes 78 may, for example, facilitate communication between the process control system and personnel outside of the process plant (e.g., personnel at home).

Although FIG. 1A illustrates a single controller 11 with a finite number of field devices 15-22 and 40-46, this is only an illustrative and a non-limiting embodiment. Any number of controllers 11 may be included in the provider devices of the process control network 100, and any of the controllers 11 may communicate with any number of wired or wireless field devices 15-22, 40-46 to control a process in the plant 10. Furthermore, the process plant 10 may also include any number of wireless gateways 35, routers 58, access points 55, wireless process control communication networks 70, access points 72, and/or gateways 75, 78.

Figure 1B:
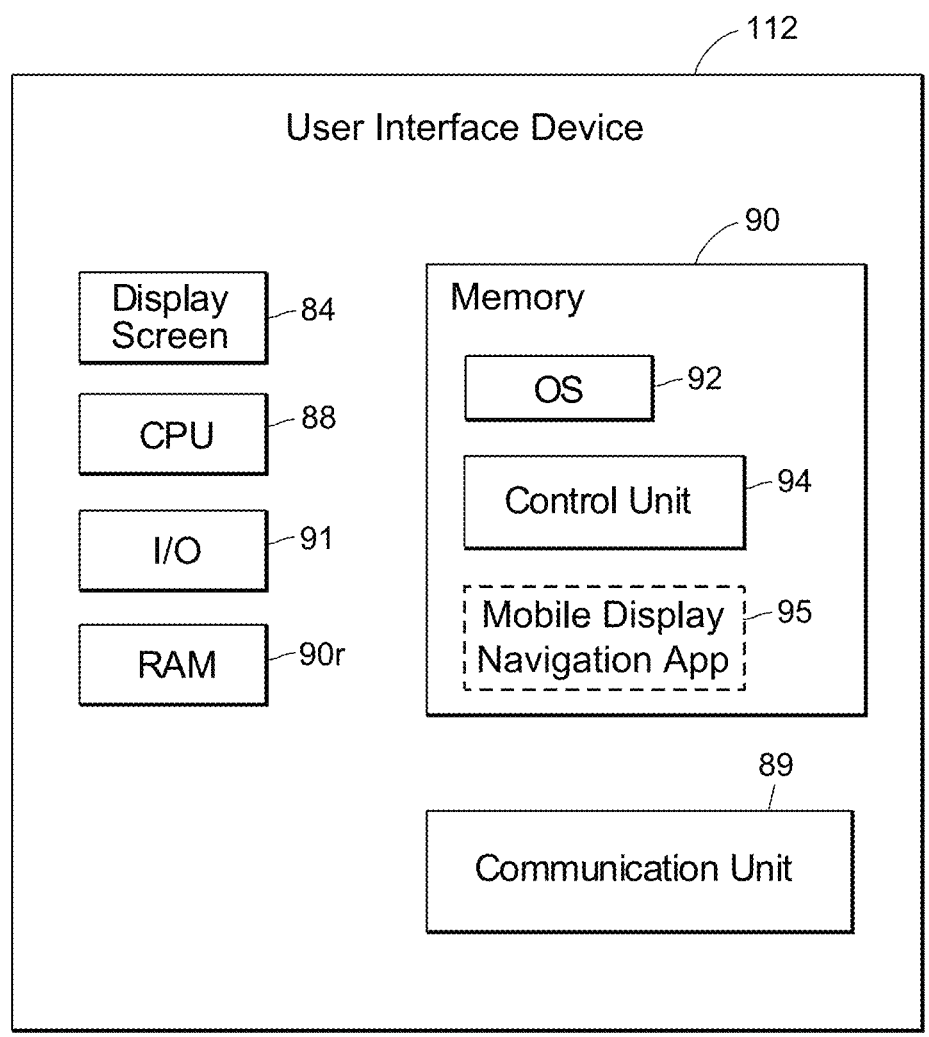
FIG. 1B is a block diagram of an example user interface device communicatively coupled to the process control network of FIG. 1A.

FIG. 1B is a block diagram of an example user interface device 112. The user interface device 112 may be communicatively coupled to the process control network 100 of FIG. 1A. The UI device 112 may be any one of a desktop computer such as a traditional operator workstation, a control room display, or a mobile computing device such as a laptop computer, a tablet computer, a mobile phone (e.g., a smart phone), a personal digital assistant (PDA), a wearable computing device, and/or any other suitable client computing device. The UI device 112 may include a display screen 84. Further, the UI device 112 includes one or more processors or CPUs 88, a memory 90, which can be, for example, a random-access memory (RAM) 90$r$, an input/output (I/O) circuit 91, and a communication unit 89 to transmit and receive data via a local area network, wide area network, or any other suitable network. The UI device 112 may communicate with the controllers 11, the server 150 and/or any other suitable computing device.

The memory 90 may include an operating system 92, a control unit 94, and a mobile display navigation application (app) 95 for controlling and/or rendering graphics on the display screen 84 and communicating with the controllers 11 to control on-line operation of the process plant. In some embodiments, the server 150 may transmit a graphic representation of a portion of the process plant to the UI device 112 and in turn, the mobile display navigation app 95 may cause the graphic representation of the portion of the process plant to be presented on the display screen 84. For example, in various embodiments, mobile display navigation app 95 may render graphics (e.g., display regions, view portions, GUIs, graphical displays, or otherwise graphical representations) of the process plant on the display screen 84. The control unit 94 may obtain user input from the I/O circuit 91, such as user input from the operator (also referred to herein as a user) and translate the user input into a request to display a preview of a process section that is not currently being displayed, a request to display a full view of a process section that is not currently being displayed, a request to switch from a preview mode to a full view mode and to display one of the process sections in the full view mode, a request to display an adjustment to a process parameter included in one of the process sections, etc.

In some embodiments, the control unit 94 may communicate the translated user input to the server 150 which may generate and transmit the requested UI to the UI device 112 for display. The mobile display navigation app 95 may generate the new UI based on the translated user input and present the new UI on the display screen 84 of the UI device 112. When the translated user input is a request to display an adjustment to a process parameter included in one of the process sections, the control unit 94 may determine whether the process parameter is locked. If the process parameter is locked, the control unit 94 may not adjust the process parameter and the mobile display navigation app 95 may present a message indicating that the process parameter is locked and cannot be adjusted on the display screen 84 of UI device 112. If the process parameter is not locked, the control unit 94 may adjust the process parameter value on the display screen 84 in accordance with the user input from the operator and may provide instructions to the controllers 11 to adjust the process parameter in the process plant. In other embodiments, the control unit 94 may communicate the translated user input to the server 150 which may generate and transmit the adjusted process parameter value to the UI device 112 for display by the mobile display navigation app 95, and provide instructions to the controllers 11 to adjust the process parameter in the process plant.

Figure 1C:
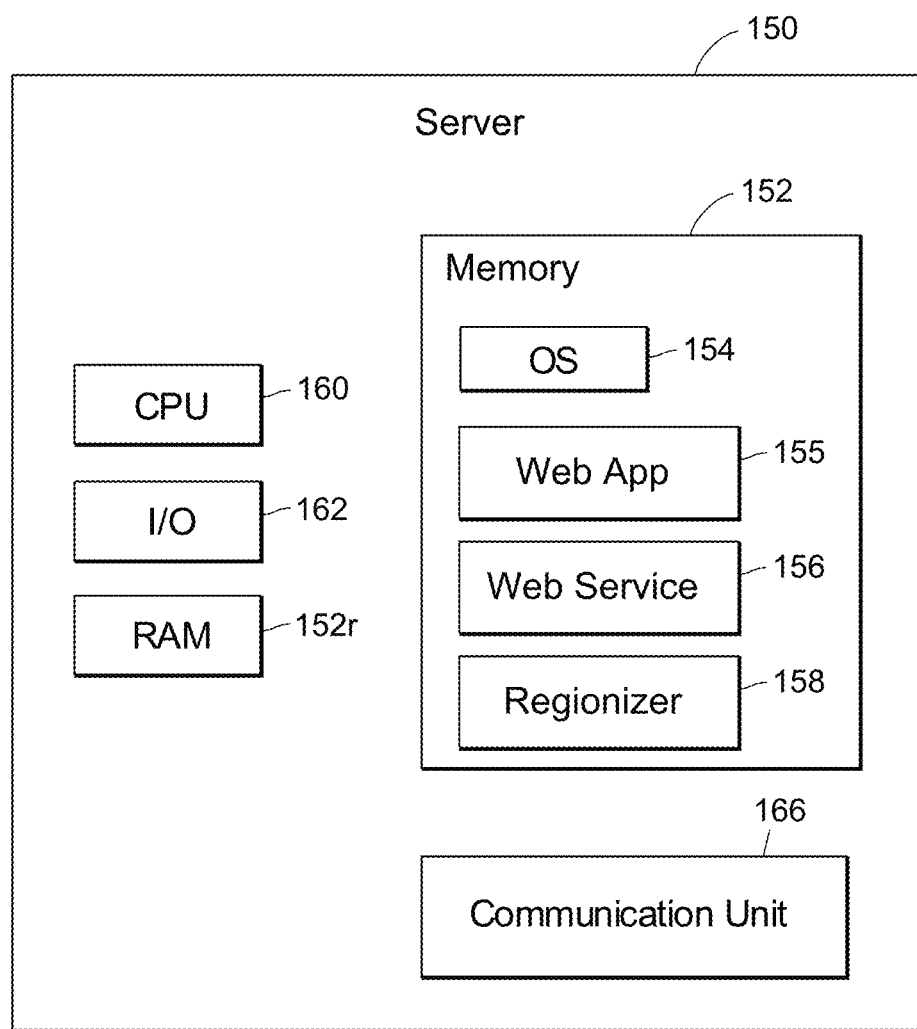
FIG. 1C is a block diagram of an example server of the process control network of FIG. 1A.

FIG. 1C is a block diagram of an example server 150 of the process control network 100 of FIG. 1A. Server 150 may be a computer or a series of computers (e.g., a server farm or redundant servers) configured to receive requests from, and respond to, any of the devices in the process control network 100. Such requests and responses may be data packet transmissions as over a computer network, such as network backbone 105. Server 150 includes one or more processors or CPUs 160, a memory 152, which can be, for example, a random-access memory (RAM) 152r, an input/output (I/O) circuit 162 for receiving administrator commands, and a communication unit 89 to transmit and receive data via a local area network, wide area network, or any other suitable network within process control network 100, such as network backbone 105.

Memory 152 of server 150 may include an operating system 154, a web application 155, a web service 156, and/or a mobile display navigation app 95 for regionizing and generating display regions, transmitting display regions and other graphics, displays, or graphic information to UI devices as described herein. For example, in some embodiments, a web service 156 may include a Simple Object Access Protocol (SOAP) based web service or a Representational State Transfer (RESTful) web service configured on server 150 to receive requests from a native mobile application of a client device (e.g., UI device 112). Web service 156 may then respond with the requested information, where the request may originated from a GUI (e.g., a user request) or by an application or component of the process plant 10. In other embodiments, a web app 155 may include a web application such as Java Server Pages (JSP), Ruby on Rails, Active Server Pages (ASP), PHP, and Node.js. or other such web application for generating dynamic web pages, displays, or graphics as described herein, and for providing such web page, displays, or graphics to client devices (e.g., UI device 112), as described herein. For example, in some embodiments, server 150 may transmit a graphic representation of a portion of the process plant to a browser implemented on a UI device 112 as described herein.

Server 150 may also include regionizer app 158 for determining one or more display regions of a full-size process plant display. This generally includes defining one or more view portion of the full-size process plant display for each of the display regions as described herein. In various embodiments, the regionizer application may determine X and Y coordinates (e.g., pixel values) of the full-size process plant display to bound graphics, generate graphics, or otherwise map graphics for transmission to and/or rendering on mobile user interface devices (e.g., UI devices 112) as described herein.

Server 150 may also include communication unit 166, under control of the server 150's operating system 154, for communicating with controllers 11 to control on-line operation of the process plant. Server 150 may communicate, via communication unit 166, with the UI device 112 and/or any other suitable computing device. For example, UI device 112 may provide instructions to server 150, where server 150 may in turn provide instructions to the controllers 11 to adjust or modify a process parameter in the process plant, e.g., for control of a process plant entity within the process plant.

Regionizer

Figure 2:
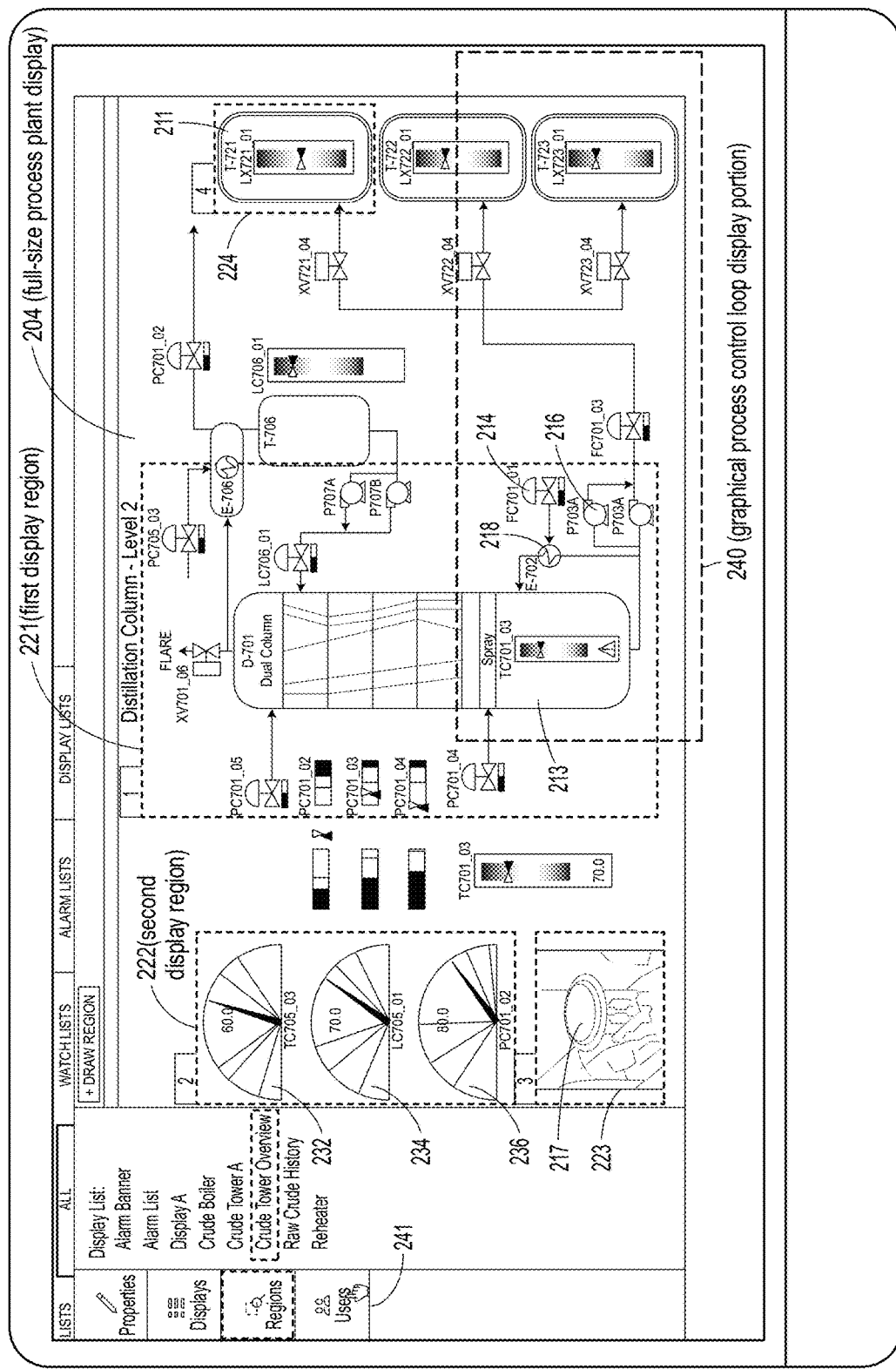
FIG. 2 is an embodiment of a full-size display screen depicting an example full-size process plant display that graphically represents at least a portion of the process plant of FIG. 1A.

FIG. 2 is an embodiment of a full-size display screen 202 depicting an example full-size process plant display 204 that graphically represents at least a portion of the process plant 10 of FIG. 1A. In various embodiments, full-size display screen 202 may be display screen 84 of a UI device 112 of process control network 100. In various embodiments, process plant display 204 may be a GUI configured for operator or user manipulation. For example, an operator of process control network 100 and/or process plant 10 may interact with full-size process plant display 204 via full-size display screen 202. For example, in various embodiments, full-size process plant display 204 is implemented as a GUI that an operator may manipulate via gestures (e.g., touch, pinch, swipe), via a cursor guided by a keyboard/mouse, and/or via other input devices configured to receive instructions (e.g., via I/O 91 circuit) and provide commands to a CPU (e.g., CPU 88). In any of these embodiments, the instructions may cause control unit 94/mobile display navigation app 95 to receive, render, update, generate, or otherwise present full-size process plant display 204 on full-size display screen 202 as described herein. In some embodiments, full-size process plant display 204 may be natively integrated with a process control network of the process plant where, for example, full-size process plant display 204 is collocated within the process plant (e.g., process plant 10) and/or used to monitor or control the process plant and/or its process control network.

In various embodiments, the graphics and information of process plant display 204 are rendered with Hyper Text Markup Language (HTML) based graphics (e.g., HTML 5 graphics). The HTML graphics may be provided, for example, from sever 150 as described herein. For example, in various embodiments, the graphics and/or information of full-size process plant display 204 may be rendered as vector based graphics, for example, by an HTML "<svg>" element or, for example, rendered or drawn by an HTML "<canvas>" element included in computer instructions provided from web application 155 of server 150. In still further embodiments, the graphics and/or information of full-size process plant display 204 may be provided via rasterized or pre-generated graphics, such as via files (e.g., JPEG, PNG, etc.) as provided by server 150.

As illustrated by the embodiment of FIG. 2, full-size process plant display 204 graphically represents numerous entities, and related information, of a process plant (e.g., process plant 10), and its process control network (e.g., process control network 100) that includes one or more processes within the process plant. These processes are generally maintained and controlled by control modules that generate and/or otherwise provide information about the processes. Such information may include process values, alarm information, and other diagnostic information. The graphics of full-size process plant display 204 are generally rendered on full-size process plant display 204 display in the form of discrete visualizations representing one or more process plant entities or information or graphics associated with the process plant entities, process values, alarm information, diagnostic information, or other information as described herein.

For example, as shown in FIG. 2, full-size process plant display 204 graphically represents a plurality of process plant entities 212-218 of the process plant 10 of FIG. 1A. That is, process plant entities 212-218, as graphically represented in full-size process plant display 204, correspond to real world process plant entities of process plant 10. For example, process plant entities comprising heat exchanger 214, pump 216, and valve 218 of full-size process plant display 204 of FIG. 2 may graphically represent a heat exchanger, pump, and valve, as represented by any of field devices 15-22 and/or or 40-46, of process plant 10 of FIG. 1A. Similarly, distillation column 212 of full-size process plant display 204 of FIG. 2 may graphically represent a distillation column (not shown) of process plant 10 of FIG. 1A.

Generally, a "display region," as used herein, is a view portion or subarea of a full-size process plant display (e.g., full-size process plant display 204) that is selected (whether automatically such as by a program or application, or manually such as by a user), for transmission to and rendering on a mobile user interface device as described herein. In some embodiments, a full-size process plant display may be a comprehensive representation of a process plant (e.g., process plant 10) that may include most or all process plant entities. In other embodiments, however, a full-size process plant display may be a less comprehensive representation of a process plant that may include only a portion of process plant and a related portion of its process plant entities.

As shown in FIG. 2, example display regions 221-224 are determined and/or generated for full-size process plant display 204. Each of display regions 221-224 define a view portion of full-size process plant display 204. Moreover, each of display regions 221-224 includes at least one graphical representation of a process plant entity selected from the plurality of process plant entities graphically represented within full-size process plant display 204. For example, first display region 221 defines a first view portion of full-size process plant display 204. The first view portion of first display region 221 includes a graphical representation of a distillation column, i.e., distillation column 212. First display region also includes other graphical representations of process plant entities, including each of heat exchanger 214, pump 216, and valve 218, each of which are connected directly or indirectly to distillation column 212 as shown.

Similarly, as a second example, second display region 222 defines a second view portion of full-size process plant display 204. The second view portion of second display region 222 includes a graphical representation of gauges 232-236 of process plant entities depicted within full-size process plant display 204. For example, in one embodiment, gauges 232-236 may graphically represent each of heat exchanger 214, pump 216, and valve 218, each of which are connected directly or indirectly to distillation column 212 as shown. More generally, in various embodiments, gauges 232-236 show key performance indicators (KPIs) of various process plant entities (e.g., process plant entities 212-218). The KPIs may include measurement parameters such as temperature(s), level(s), and/or pressure(s) of various process plant entities. A listing of example measurement parameters are shown, for example, for FIG. 6 as described herein.

As a third example, third display region 223 defines a third view portion of full-size process plant display 204. The third view portion of third display region 223 includes a graphical representation of a valve. In particular, third display region 223 shows a video stream or image 217 of a valve of process plant 10, the value being any of field devices 15-22 and/or or 40-46. In some embodiments, video stream and/or image 217 could be a rotating video stream showing video of multiple devices (e.g., each of field devices 15-22 and/or or 40-46) at different times) to show a graphical depiction (via video) of the valves operating within process plant 10. Accordingly, a display region may include a video stream or image of a process plant entity as one type of graphical representation on full-size process plant display 204.

As a fourth example, fourth display region 224 defines a fourth view portion of full-size process plant display 204. The fourth view portion of fourth display region 224 includes a graphical representation of a tank 211. Tank 211 may be a tank for holding "heavies," such as heavy chemicals or compounds, e.g., hydrocarbons or the like.

In some embodiments, determination of display regions is performed by a regionizer application (app) automatically detecting or determining positions of one or more display regions (e.g., display regions 221-224) within a full-size process plant display (e.g., full-size process plant display 204). The positions may be detected or determined, for example, by analyzing x and y pixel coordinates with full-size process plant display 204. In various embodiments, regionizer app comprises a software application including computer instructions for determining display regions, such as display regions 221-224. In some embodiments, the regionizer application 158 may execute in memory 152 of server 150 and facilitate the determination of display regions 221-224 by receiving requests and providing responses through web application 155 and/or web service 156 as described herein. In other embodiments, the regionizer app may execute in memory 90 of a UI device 112.

In some embodiments the regionizer application may automatically determine display regions (e.g., display regions 221-224) by detecting a frequency of access corresponding view portions of each of the one or more display regions (e.g., display regions 221-224) of a full-size process plant display (e.g., full-size process plant display 204). In a specific embodiment, for example, regionizer app computer may determine a collection of interconnected graphical process plant entities with full-size process plant display 204. For example, first display region 221 may correspond to an area defining a group of process plant entities (e.g., heat exchanger 214, pump 216, and valve 218), that are generally interconnected with respect to distillation column 212. Regionizer app computer may detect that these process plant entities form a collection of interconnected graphical process plant entities, and therefore, determine a view portion defining first display region 221.

In another embodiment the regionizer app may automatically determine display regions (e.g., display regions 221-224) by analyzing portions of full-size process plant display 204 that have common zoom-in areas. For example, the regionizer app may track portions of full-size process plant display 204 where users have zoomed in frequently by keeping count of how many times a user zooms into a view portion, i.e., an area of pixels of full-size process plant display 204 that users typically zoom in on. Based on the frequency, the regionizer app may determine a view portion of a given region, e.g., second display region 222 where users frequently zoom in to look at measurement parameters of gauges 232-236. In a related embodiment, the regionizer app may suggest (via a suggestion engine) to a user to make a certain view portion a display area if it is commonly zoomed-in. For example, a user zooming in on the view portions of display areas 223 or 224 may receive a graphic popup including a suggestion to create one or both of these view portions into display areas for generation and transmission to mobile user interface devices as described herein.

In some other embodiments, determination of one or more of display regions 221-224 is performed by a regionizer application (app) receiving one or more user (e.g., an operator or configuration engineer) selections. In some embodiments, the regionizer app comprises a software application including computer instructions for receiving the user selections for identification and location of the display regions 221-224. In some embodiments, the regionizer application 158 may execute in memory 152 of server 150 and facilitate section of the regions 221-224 by receiving requests and providing responses through web application 155 and/or web service 156 as described herein. In other embodiments, the regionizer app may execute in memory 90 of a UI device 112.

User selections may define one or more corresponding locations (e.g., x and y pixel-based coordinates) of the one or more display regions 221-224 within the full-size process plant display 204. In some embodiments, for example, a selection may be received at a processor (e.g., CPU 88) of a UI device 112 (e.g., a UI device with full-size display screen 202 of FIG. 2). For example, a user (e.g., an operator or configuration engineer) may place display regions anywhere on an existing process display (e.g., full-size process plant display 204). Accordingly, in such embodiments, display regions, such as display regions 221-224, may be added by a configuration engineer during a configuration time. In this way, a user configures the display regions such that various view portions of the full-size process plant display 204 may be rendered on mobile user interface devices as described herein, either in single views or in a sequential series of pages that the user can easily swipe through on the mobile device.

In some embodiments, a GUI profile may predefined for a user. For example a GUI profile may be determined based on one or more selections provided by a user. In some embodiments, GUI profiles may be created or accessed by choosing an option 241 the full-size process plant display 204. The GUI profile may comprise GUI settings that define the quantity of one or more display regions, i.e., how many display regions to show for a given user. In further embodiments, the GUI settings may define one or more locations of the display regions (e.g., display regions 221-224) within the full-size process plant display. In still further embodiments, the GUI settings may define one or more zoom levels of the one or more display regions (e.g., display regions 221-224). In various embodiments, the GUI settings may be transmitted to a mobile user interface device. The mobile user interface device may then configure the one or more display regions based on the GUI settings.

In some embodiments, a GUI profile or GUI settings may be determined based on a device type of a mobile user interface device. For example, mobile user interface devices typically have different sizes, shapes, etc., which may cause the display regions (display regions 221-224) compatible with those different sizes, shapes to be stored as part of a GUI profile. In such embodiments, the display regions 221-224 may be chosen, either by a user or automatically by the regionizer app, to be compatible with a given size or shape of a mobile user interface device.

Figure 3A:
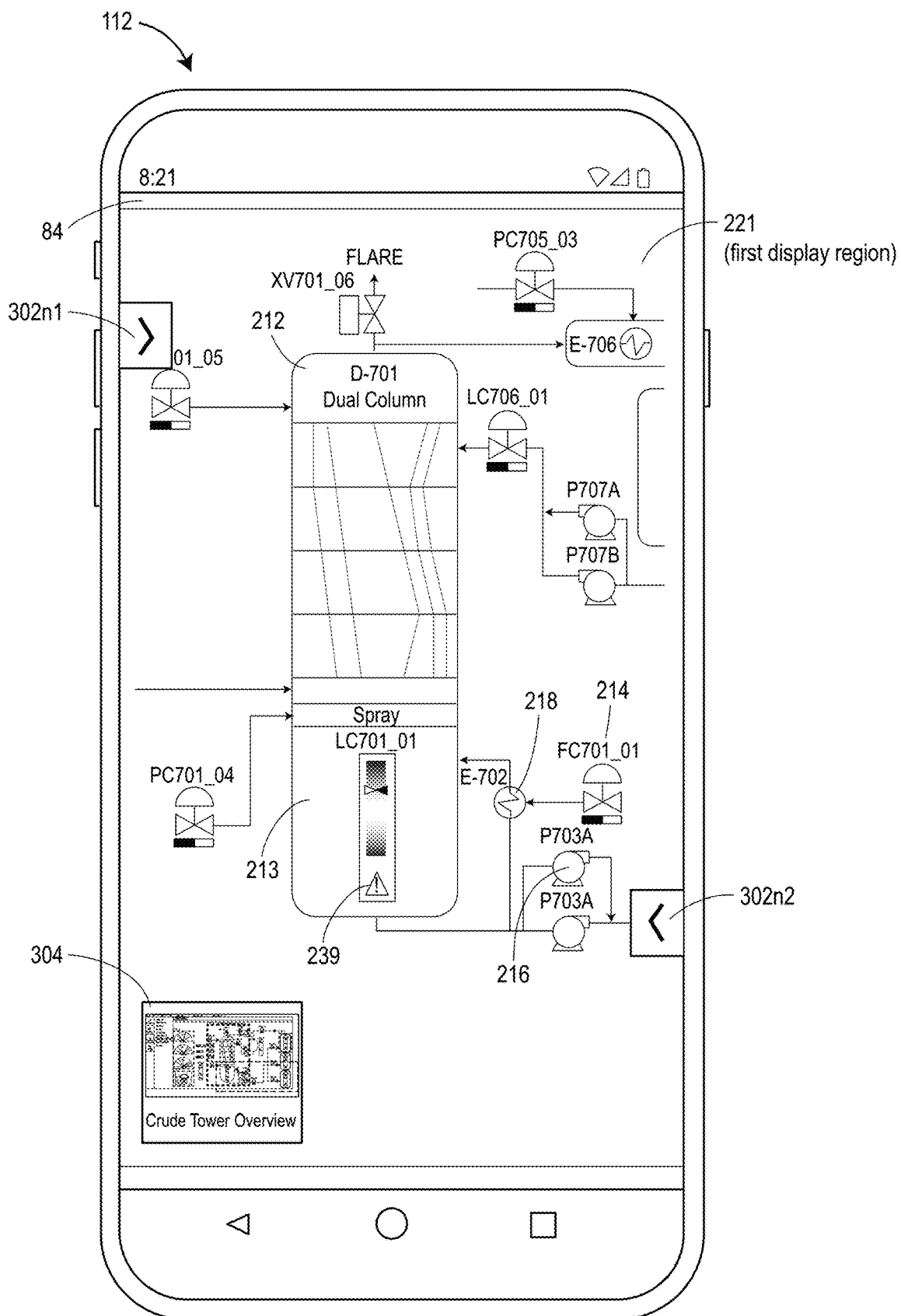
FIG. 3A is an embodiment of a mobile user interface device rendering, on a display screen of the mobile user interface device, a first display region of the example full-size process plant display of FIG. 2.

FIG. 3A is an embodiment of a mobile user interface device 112 rendering, on a display screen 84, a first display region 221 of the example full-size process plant display 204 of FIG. 2. In various embodiments, mobile user interface device 112 may be a UI device 112 as used by an operator of process plant 10 as described for FIG. 1A. In the embodiment of FIG. 3A, mobile user interface device 112 is a mobile phone or smart phone device.

As shown by FIG. 3A, first display region 221 of full-size process plant display 204 is rendered on display screen 84. In various embodiments, mobile display navigation app 95 renders first display region 221 display screen 84. In some embodiments mobile display navigation app 95 may be a browser app (such as Safari or Chrome application configured for execution on a mobile user interface device). In other embodiments, mobile display navigation app 95 may be native mobile app (such as an Apple iOS app or Google Android app) executing on a processor 88 of UI device 112.

Mobile user interface device 112, for example via mobile display navigation app 95, is configured to receive first display region 221 from server 150. For example, in a browser based embodiment, server 150 executes web application 155. In such embodiments, mobile display navigation app 95 may receive all or part of full-size process plant display 204 from server 150 as HTML compatible graphics (e.g., HTML 5 based graphics), which can include vector and/or rasterized graphics. In such embodiments, server 150 may further send HTML instructions, which may be part of or separate from the graphics of full-size process plant display 204, where the HTML instructions are configured to cause processor 88 to render first display region 221 on display screen 84 of UI device 112.

As a further example, in a native mobile app embodiment, server 150 executes web service 156. In the native mobile app embodiment, mobile display navigation app 95 is implemented as a native application (e.g., an iOS or an Android mobile application) and receives all or part of full-size process plant display 204 from server 150 as vector and/or rasterized graphics by requesting the graphics from web service 156. In such embodiments, mobile display navigation app 95 may include native instructions (e.g., iOS or Android based instructions, such as SWIFT, Objective-C, or Java based instructions) configured to cause processor 88 to render first display region 221 on display screen 84 of UI device 112.

In the embodiment of FIG. 3A, because mobile user interface device 112 is a mobile phone, the surface area of display screen 84 is less than (e.g., less than half) a full-size surface area of full-size display screen 202 of FIG. 2. As a result, as shown in FIG. 3A, mobile display navigation app 95 renders first display region 221 at a zoom level relative to display screen 84. This generally results in a focused or greater zoom level for first display region 221 that shows additional detail, information, or measurement than full-size process plant display 204.

For example, as shown by FIG. 3A, first display region 221 is rendered at a greater zoom level that includes the same information and graphics as full-size process plant display 204 of FIG. 2, and also additional information. For example, mobile display navigation app 95 renders first display region 221 of FIG. 3A depicting process plant entities 212-218 (i.e., distillation column 212, heat exchanger 214, pump 216, valve 218, etc.) also shown by full-size process plant display 204 of FIG. 2. Mobile display navigation app 95 also renders additional information at the more focused zoom level shown for FIG. 3A. For example, FIG. 3A also includes alarm adorner graphic 239 that indicates an alarm has been activated for distillation column 212. In some embodiments, mobile display navigation app 95 may render a focused view when the alarm adorner graphic is triggered for display (e.g., when alarm adorner graphic 239 has been activated for distillation column 212). More generally, in various embodiments, display regions (e.g., first display region 221) may be rendered by mobile display navigation app 95 to include alarm adorner graphics (e.g., alarm adorner graphic 239) or a measurement parameters (e.g., measurement parameters of FIG. 6 as described herein) of a process plant entity selected from the plurality of process plant entities (e.g., process plant entities of process plant 10).

In some embodiments, mobile display navigation app 95 may be configured to render the alarm adorner graphics and/or measurement parameter in real-time or near-real time. In such embodiments, a change in an alarm state or a measurement parameter of the related process plant entity will cause the display region (e.g., first display region 221) to be updated on mobile user interface device 112. For example, in the embodiment of FIG. 3A, a change in the alarm state of distillation column 212 may cause server 150 to transfer the alarm state information to mobile display navigation app 95. Mobile display navigation app 95 may then no longer render alarm adorner graphic 239 on display screen 84.

In further embodiments, mobile display navigation app 95 may be configured to render a display region (e.g., first display region 221) with an overview panel indicating a location of the of the display region within a full-size process plant display. For example, as shown in FIG. 3A, mobile display navigation app 95 rendered first display region 221 to include overview panel 304 that indicates (by a view portion) the location of the of first display region 221 within full-size process plant display 204. In some embodiments, overview panel 304, and its related view portion, may be determined by the regionizer app executing on server 150. In other embodiments, mobile display navigation app 95 may determine and position the view portion as first display region 221 is rendered on display screen 84.

In various embodiments, a mobile UI device 112 may be confirmed to receive a selection corresponding to a process plant entity. The selection may initiate control of the process plant entity within the process plant (e.g., process plant 10). For example, as shown in FIG. 3A, mobile display navigation app 95 may receive a selection on display screen 84 corresponding to a location of distillation column 212. The selection may cause a control window (not shown) to be displayed on display screen 84. The control window may include graphic controls and/or input boxes to receive commands or input. For example, in the embodiment of FIG. 3A, a control window may receive a command to adjust or modify a parameter of distillation column 212 in response to the alarm adorner graphic 239 on display screen 84. The command may be transmitted to server 150, where server 150 may transmit the command to distillation column 212 via process control network 100. In some embodiments the command may be sent via a voice command, where mobile user interface device 112 receives an audible instruction (voice) at a microphone (not shown) of mobile UI device 112 and where processor (e.g., CPU 88) converts (e.g., via natural language processing) the audible instruction to the command that is sent to server 150 to adjust or modify a parameter of distillation column 212 as described above herein. In this way monitoring and control of a process plant (e.g., process plant 10) is feasible on a small screen device such mobile user interface device 112 as describe herein.

In various embodiments, display regions may be configured to be rendered sequentially. For example, in the as shown in FIG. 3A, when mobile display navigation app 95 received display regions 221-224, first display region 221 is shown first. In some embodiments, mobile display navigation app 95 may include navigation panel(s) to toggle rendering of display regions, e.g., in a sequential manner. For example, as shown in FIG. 3A, mobile display navigation app 95 renders navigation panels 302$n1$ and 302$n2$ on display screen 84. A selection of navigation panel 302$n1$ causes mobile display navigation app 95 to render a next region (e.g., second display region 222) on display screen 84. A selection of navigation panel 302$n2$ causes mobile display navigation app 95 to render a previous or end region (e.g., fourth display region 224) on display screen 84. By using navigation panels 302$n1$ and 302$n1$ an operator may easily move or navigate among display regions 221-224 as determined for full-size process plant display 204.

In other embodiments, a user may move or navigate among the move or navigate among display regions 221-224 by swiping left or right. In such embodiments, mobile display navigation app 95 would detect a user's swipe gestures as commands to toggle among the display regions 221-224.

Figure 3B:
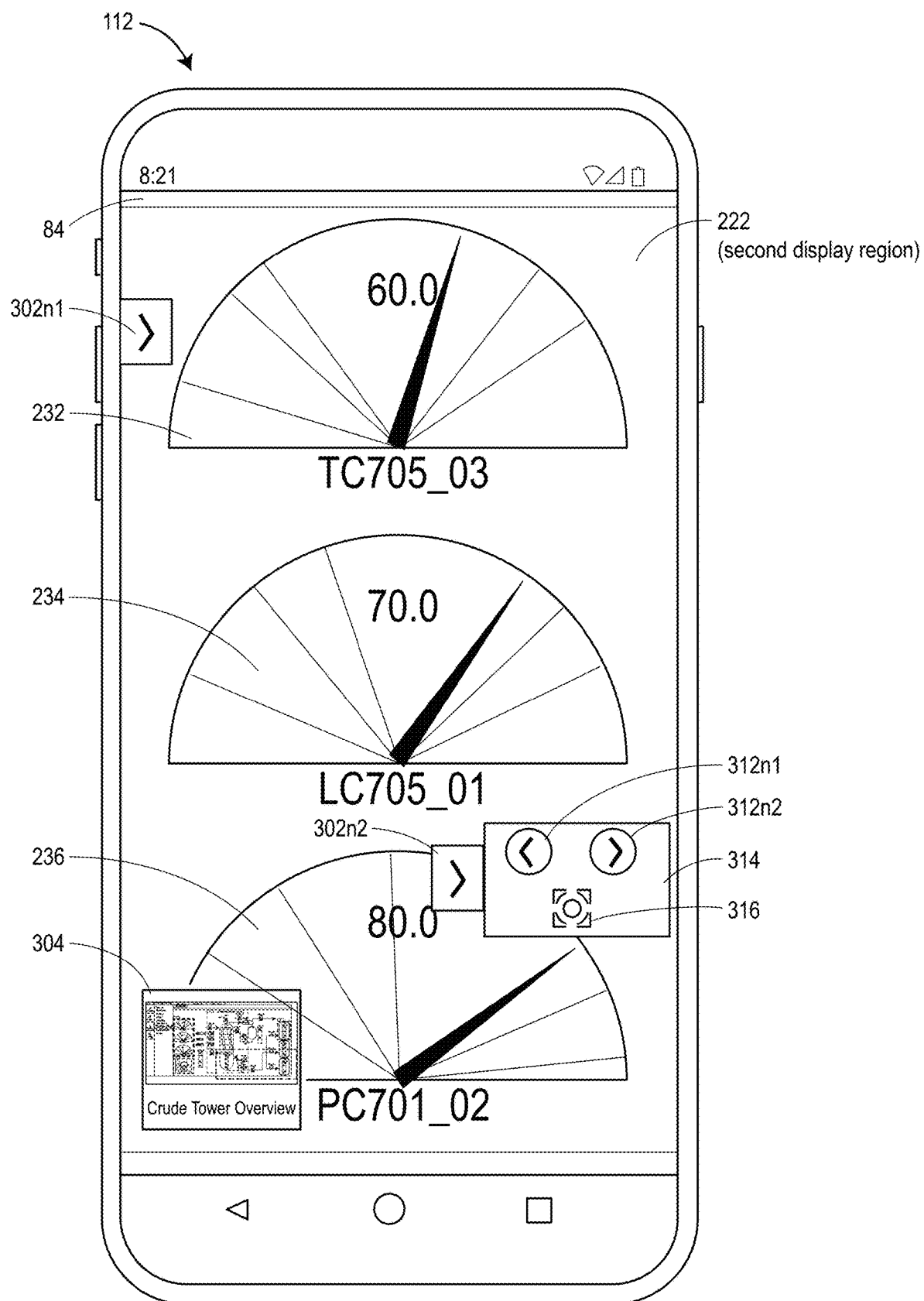
FIG. 3B is the mobile user interface device of FIG. 3A rendering, on the display screen, a second display region of the example full-size process plant display of FIG. 2.

FIG. 3B is the mobile user interface device 112 of FIG. 3A rendering, on the display screen 84, a second display region (e.g., second display region 222) of the example full-size process plant display 204 of FIG. 2. In various embodiments, mobile display navigation app 95 may be configured to size view portion of a display fully on the display screen of the mobile user interface device. For example, in the embodiment of FIG. 3B, mobile display navigation app 95 sizes the view portion of second display region 222 fully on display screen 84. The full size rending also users of mobile user interface device 112 to better view second display region 222 and its related information, e.g., as provided by graphical gauges 232-236, because the rendering would be at a higher zoom level and/or higher resolution.

In some embodiments, mobile display navigation app 95 may associate display regions (e.g., display regions 221-114) at variable zoom level values that correspond to detail levels (e.g., graphical levels and/or measurement parameter levels) of each display region's view portion of the full-size process plant display. For example, in the embodiments of FIGS. 3A and 3B, first display region 221 may be associated with a first variable zoom level value and second display region 222 may be associated with a second variable zoom level value. The second variable zoom level value may be a zoom level value of "3" and first variable zoom level value may be a zoom level of "2." The different zoom level values may be interpreted by mobile display navigation app 95 as to when to render each of first display region 221 and second display region 222, i.e., at different zoom levels, which, may be different focus levels of the graphics of full-size process plant display 204. For example, as shown in FIG. 3B, second display region 222 is shown with a higher degree of focus, with graphical gauges 232-236 fully rendered on display screen 84, which corresponds to the greater zoom level value of 3. In contrast, as shown in FIG. 3A, first display region 221 is shown with a lower degree of focus, with process plant entities 212-218 rendered on display screen 84 with bordering graphics or graphical area, which corresponds to the lesser zoom level value of 2. In some embodiments, an operator or configuration engineer, may determine or adjust the zoom level values of the various display regions to accommodate various types of mobile user interface device surfaces. In other embodiments, the regionizer app 158 may automatically determine or adjust the zoom level values of the various display regions to accommodate various types of mobile user interface device surfaces. In general, determination and/or adjustment of the display regions provides an end user of mobile display navigation app 95 with an experience that the display regions are "custom built" for their respective mobile user interface devices, and without a computer programmer or designer needing to create and/or maintain additional process displays for each of the display regions.

FIG. 3B illustrates an embodiment where display regions may be rendered in a sequential order with respect to one another. For example, a first display region may be sequentially ordered with respect to a second display region, where mobile user interface device, via mobile display navigation app 95, is adapted to render the first display region before the second display region. For example, in the embodiment of FIG. 3B, first display region 221 may be sequentially ordered with respect to second display region 222. Mobile user interface device 112, via mobile display navigation app 95, may be adapted to render first display region 221 before second display region 222. As shown in FIG. 3B, a navigational panel 314 is rendered by mobile display navigation app 95. Navigational panel 95 is configured to receive a selection (e.g., at 312n1 or 312n2) to toggle rendering of first display region 221 and rendering of the second display region 222 on display screen 84 of mobile user interface device 112. Selection 312n1 and/or 312n2 cause mobile display navigation app 95 to toggle the rendering of first display region 221 and rendering of the second display region 222 as described for selections from navigation panels 302n1 and 302n2 described for FIG. 3A herein.

Navigation panel 314 also includes a zoom control 316. Zoom control 316 allows a user to adjust the zoom level and/or zoom level value of second display region 222 so such that mobile display navigation app 95 renders a more focused or less focused view portion of full-size process display 204 on display screen 84. For example, in the embodiment of FIG. 3B, a user may have accessed zoom control 316 to adjust the zoom level render of second region 222 fully within display screen 84 when the user moved from first region 221 to second region 222.

Figure 4:
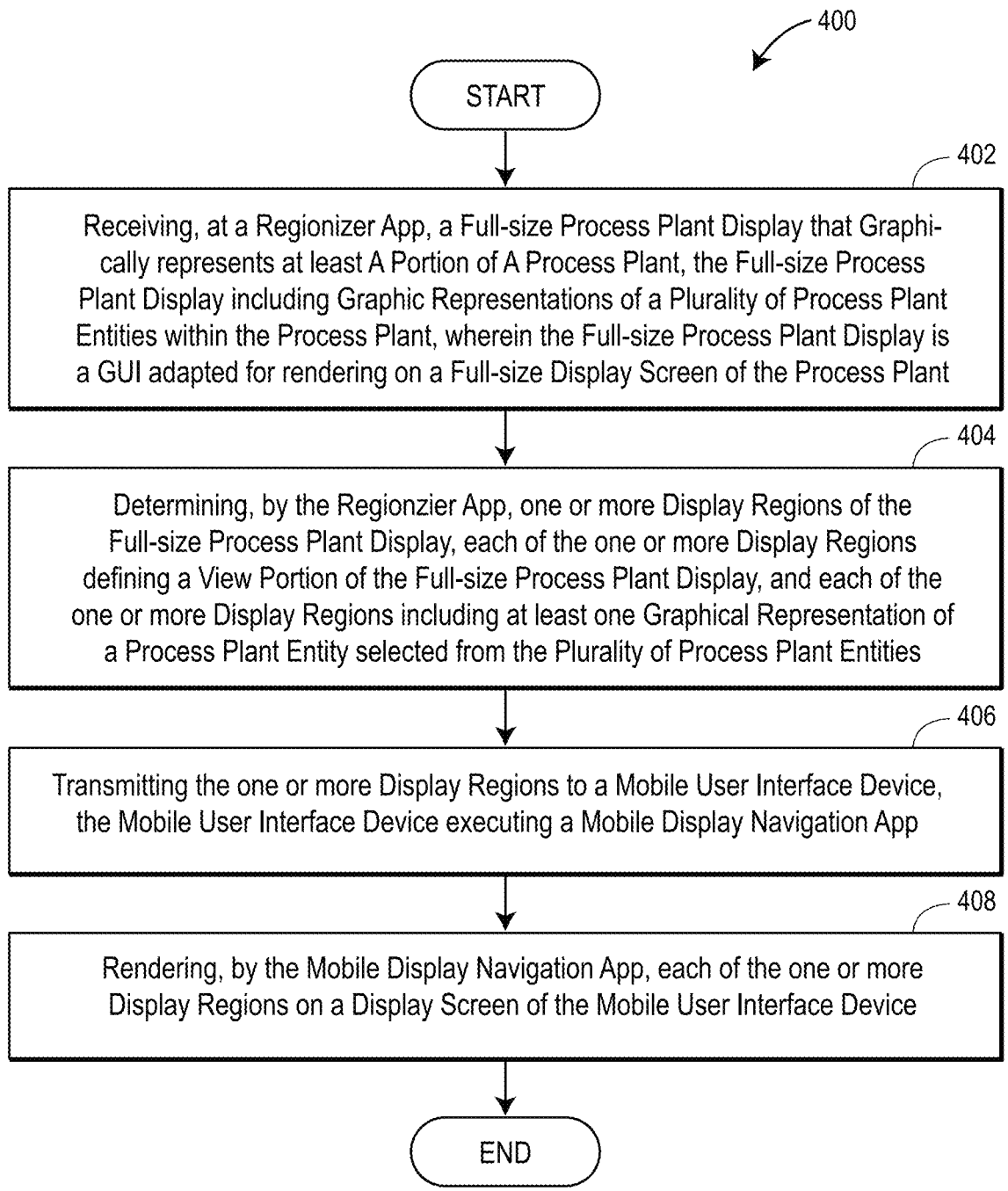
FIG. 4 is a flow diagram representing an exemplary GUI based method for regionizing full-size process plant displays, such as the example full-size process plant display of FIG. 2, for rendering on mobile user interface devices.

FIG. 4 is a flow diagram representing an exemplary GUI based method 400 for regionizing full-size process plant displays (e.g., full-size process plant display 204) for rendering on mobile user interface devices. For example, at least in one embodiment, FIG. 4 describes a method for regionizing first display region 221 and second display region 222 of full-size process plant display 204 for rendering (e.g., by mobile display navigation app 95) on mobile user interface device 112 as described herein for FIGS. 3A and 3B. As the term is used herein, "regionizing" generally refers to defining one or more view portions of a full-size process plant display (e.g., full-size process plant display 204) for generating or otherwise determining display regions (e.g., display regions 221-224) as described herein. In various embodiments, a regionizer application (e.g., regionizer app 158) may determine or locate x and/or y coordinates (e.g., which may correspond to pixel values) of the full-size process plant display (e.g., full-size process plant display 204) to generate, bound or map, or otherwise determine graphics for transmission to a mobile user interface devices (e.g., UI devices 112) as described herein. In some embodiments, the display regions (e.g., display regions 221-224) may be determined by user selection. In other embodiment, the display regions (e.g., display regions 221-224) are automatically determined by regionizer app 158.

At block 402 of FIG. 4 a regionizer application (e.g., regionizer app 158 executing on server 150) receives a full-size process plant display (e.g., full-size process plant display 204) that graphically represents at least a portion of a process plant (e.g., process plant 10). The full-size process plant display may include graphic representations (e.g., graphical process plant entities 212-218) of a plurality of process plant entities (e.g., process plant entities 15-22 and 40-46) within the process plant (e.g., process plant 10). The full-size process plant display (e.g., full-size process plant display 204) may be a GUI adapted for rendering on a full-size display screen (full-size display screen 202) of the process plant. For example, full-size display screen may be a UI device 112 communicatively coupled to process control network 100 and/or network backbone 105 as described for FIG. 1A herein. The full-size process plant display (e.g., full-size process plant display 204) may be an existing full-size process plant display previously generated or designed for a process plant.

At block 404 regionizer app 158 determines one or more display regions of the full-size process plant display. For example, the display regions may include any one or more of display regions 221-224 of FIG. 2. Each of the one or more display regions (e.g., 221-224) define a view portion of the full-size process plant display (e.g., full-size process plant display 204). For example, as shown in FIG. 2, each display region 221-224 defines a rectilinear view portion defining the dimensions (e.g., x-y coordinates, such as x-y pixel coordinates) corresponding to subareas of full-size process plant display (e.g., full size process plant display 204). In other words, the view portions map or define regions or areas of a full-size process plant display to a given display region. Each of the one or more display regions (e.g., display regions 221-224) includes at least one graphical representation of a process plant entity selected from the plurality of process plant entities. For example, each display region 221-224 includes the process plant entities as described herein for FIG. 2.

At block 406 one or more processors, such CPU 160 of server 150, may transmit the one or more display regions (e.g., display regions 221-224) to a mobile user interface device (e.g., mobile user interface device 112, as shown by example in FIGS. 3A and 3B).

In various embodiments disclosed herein, the mobile user interface 112 may execute a mobile display navigation app (e.g., mobile display navigation app 95). In some embodiments mobile display navigation app 95 may be a browser app (such as Safari or Chrome application configured for execution on a mobile user interface device). In other embodiments, mobile display navigation app 95 may be native mobile app (such as an Apple iOS app or Google Android app) executing on a processor 88 of UI device 112.

Mobile user interface device 112, for example via mobile display navigation app 95, is configured to receive display regions (e.g., display regions 221-224) from server 150. For example, in a browser based embodiment, server 150 executes web application 155. In such embodiments, mobile display navigation app 95 may receive all or part of full-size process plant display 204 from server 150 as HTML compatible graphics (e.g., HTML 5 based graphics), which can include vector and/or rasterized graphics. In such embodiments, server 150 may further send HTML instructions, which may be part of or separate from the graphics of full-size process plant display 204, where the HTML instructions are configured to cause processor 88 to render the display regions (e.g., display regions 221-224) on display screen 84 of UI device 112.

As a further example, in a native mobile app embodiment, server 150 executes web service 156. In the native mobile app embodiment, mobile display navigation app 95 is implemented as a native application (e.g., an iOS or an Android mobile application) and receives all or part of full-size process plant display 204 from server 150 as vector and/or rasterized graphics by requesting the graphics from web service 156. In such embodiments, mobile display navigation app 95 may include native instructions (e.g., iOS or Android based instructions, such as SWIFT, Objective-C, or Java based instructions) configured to cause processor 88 to render the display regions (e.g., display regions 221-224) on display screen 84 of UI device 112.

At block 408, mobile display navigation app 95 renders each of the one or more display regions (e.g., display regions 221-224) on a display screen (e.g., display screen 84) of the mobile user interface device 112. In various embodiments, the display screen 84 of the mobile user interface device 112 comprises a surface area that is less than a full-size surface area of the full-size display screen (e.g., full-size display screen 202). For example, this is shown by FIGS. 2, 3A, and 3B, where the display screen 84 of the mobile user interface device 112 of FIGS. 3A and 3B comprises a surface area that is less than a full-size surface area of full-size display screen 202 of FIG. 2.

Mobile display navigation app 95 may render display regions (e.g., display regions 221-224) on display screen 84 of a mobile user interface device using different techniques as disclosed herein for different embodiments. In a first rendering embodiment, one or more processors (e.g., CPU 160) of server 150 may transmit the full-size process plant display (e.g., full-size process plant display 204) to the mobile user interface device. In some embodiments, the mobile user interface device 112 may save a copy of the full-size process plant display (e.g., full-size process plant display 204) in memory 90. Mobile display navigation app 95 may access the full-size process plant display (e.g., full-size process plant display 204) from memory 90 when rendering or otherwise manipulating graphics, display regions, view portions, etc. associated with full-size process plant display (e.g., full-size process plant display 204) as described herein.

In some embodiments, mobile display navigation app 95 may render the one or more display regions (e.g., display regions 221-224) on the display screen 84 of the mobile user interface device 112 by bounding a corresponding view portion of each of the one or more display regions (e.g., display regions 221-224) to the full-size process plant display (e.g., full-size process plant display 204). For example, the mobile display navigation app 95 may access the full-size process plant display (e.g., full-size process plant display 204) from memory 90 and map the view portion, including zooming, panning, and/or positioning the view portion to the full-size process plant display (e.g., full-size process plant display 204). Accordingly, in such embodiments, while mobile display navigation app 95 would have accessed full-size process plant display 204 from memory 90, only the view portion of the display region (e.g., a first view portion of first display region 221 as shown for FIG. 3A or a second view portion of display region 222 as shown for FIG. 3B) would be shown on display screen 84. This would reduce the processing resources required by mobile UI device 112.

In some embodiments, mobile display navigation app 95 may be configured to automatically detect a mobile screen size and then automatically render a display region (e.g., first display region 221) as determined or generated the display screen 84 of mobile user interface device 112 based on the screen size and/or resolution of the display screen 84. The determination or generation of the display regions (e.g. display regions 221-224) may be made before or during the transmission of the display regions (e.g., display regions 221-224) to the mobile display navigation app 95. For example, determination or generation of the display regions 221-224 may be made when the mobile user interface device 112 requests the display regions from server 150.

In a second rendering embodiment, newly generated display regions may be created from a full-size process plant display (e.g., full-size process plant display 204). In such embodiments, each new display may be generated by the server 150 and may be separate from full-size process plant display such that each new display is not dependent on full-size process plant display (e.g., full-size process plant display 204). Such embodiments decrease computer network payload and traffic as the full-size process display need not be transferred (e.g., over network backbone 105).

In the new displays embodiment, one or more processors (e.g., CPU 160 of server 150) generates one or more new displays based on the determining of the one or more display regions (e.g., display regions 221-224) of the full-size process plant display (e.g., full-size process plant display 204). In such embodiments, each new display may be generated by server 150 to correspond to the view portion of its corresponding display region. For example, server may determine the view portions of each of display regions 221-224 and generate new displays for each region. In the new displays embodiment, the server 150 may transmit the one or more display regions by transmitting the one more new displays to the mobile user interface device 112. Mobile display navigation app 95 may render the one or more new displays on the display screen of the mobile user interface device. For example, each of first display region 221 of FIG. 3A and/or second display region 222 of FIG. 3B may represent a new display as generated by server 150 and transmitted to mobile user interface device 112. The generation of the new displays corresponding to display regions (e.g. display regions 221-224) may be made before or during the transmission of the display regions (e.g., display regions 221-224) to the mobile display navigation app 95. For example, determination or generation of the new displays of display regions 221-224 may be made when the mobile user interface device 112 requests the display regions from server 150.

Display Auto-Introspection

In various embodiments, GUI based systems and methods are disclosed for automatically detecting graphical process control loop display portions within full-size process plant displays for rendering on mobile user interface devices. In such embodiments, graphic information within a display (e.g., full-size process plant display 204) is automatically introspected (without user intervention) by a processor (e.g., CPU 88 of mobile UI device 112 or CPU 160 of server 150) and provided to mobile display navigation app for rendering process plant related visualizations, views, and/or graphics configured for a small surface area devices, such as a mobile user interface device 112.

In various embodiments, a display auto-introspection routine may analyze a full-size process plant display (e.g., a full-size process plant display 204) to determine visualizations of process modules as graphical process control loop display portions. In some embodiments, the process modules may be rendered, e.g., by mobile display navigation app 95, in a scrollable list format. In further embodiment, visualization related to alarm information may be rendered in a scrollable list format. In this way, display auto-introspection assists operators maintain or even increase operational awareness even on small surfaces.

Figure 5A:
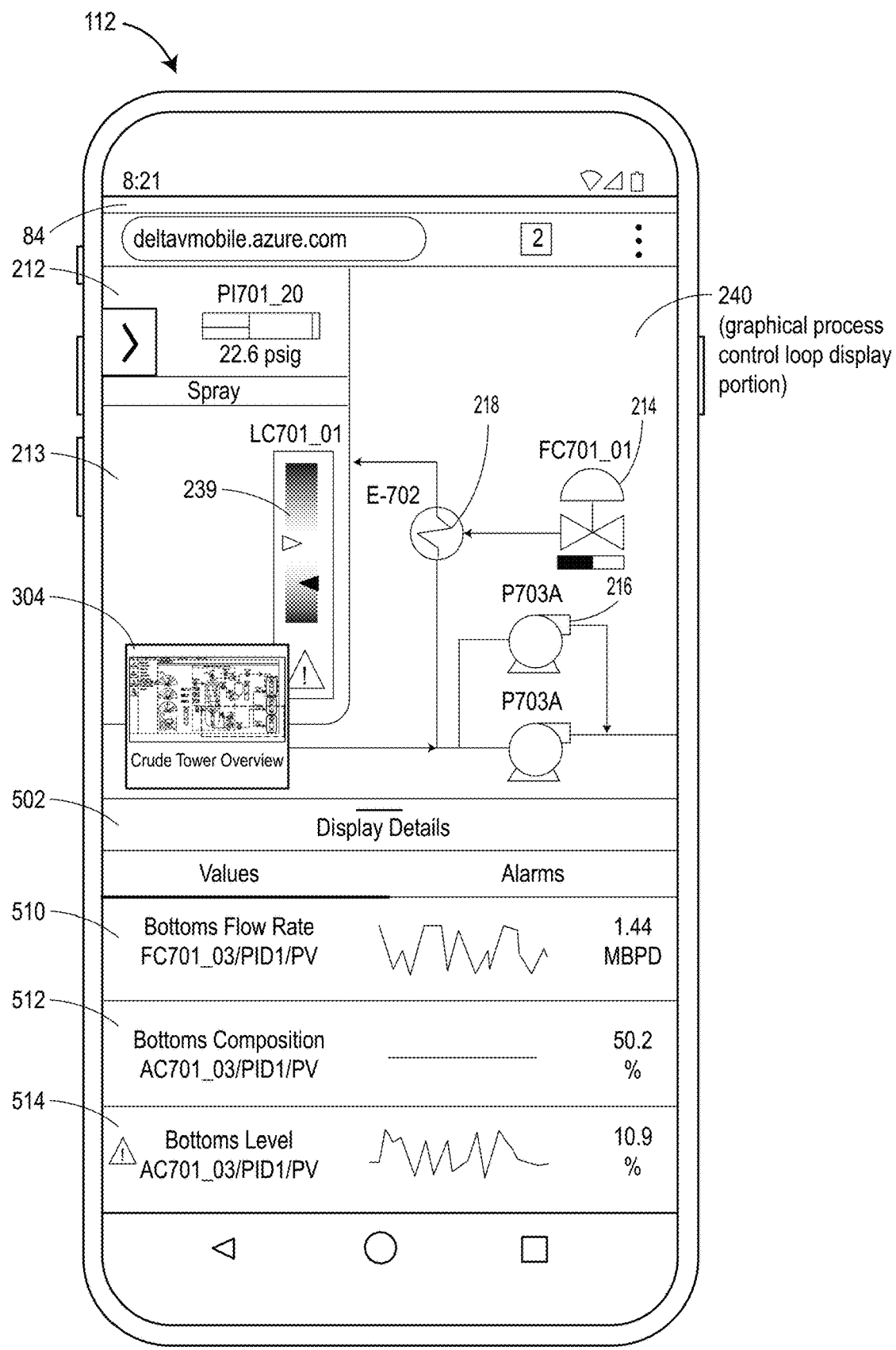
FIG. 5A is an embodiment of a mobile user interface device rendering, on a display screen of the mobile user interface device, an example graphical process control loop display portion of the example full-size process plant display of FIG. 2, and an example selectable display list including measurement parameters of one or more process plant entities depicted within the example graphical process control loop display portion.

FIG. 5A is an embodiment of a mobile user interface device 112 rendering, on a display screen 84, an example graphical process control loop display portion (e.g., graphical process control loop display portion 240) of the example full-size process plant display (e.g., full-size process plant display 204) of FIG. 2.

As shown in FIG. 5A, graphical process control loop display portion 240 includes process plant entities selected from full-size process plant display 204. These include, for example, process plant entities 212-218 as described herein for FIG. 2. Mobile display navigation app 95 may also render overview panel 304 with graphical process control loop display portion 240, which operates the same manner as described herein for FIGS. 3A and 3B.

FIG. 5A further illustrates an example selectable display list (e.g., selectable display list 502) including measurement parameters (e.g., measurement parameters 510-514) of one or more process plant entities depicted within the example graphical process control loop display portion. As shown, selectable display list 502 is shown in a first area of display screen 84 and graphical process control loop display portion 240 is shown in a second area of display screen 84.

As shown in the embodiment of FIG. 5A, mobile display navigation app 95 may render measurement parameters 510-514 one or more process plant entities on display screen 84 of mobile user interface device 112. In FIG. 5A, graphical process control loop display portion 240 focuses on a process control loop of distillation column 212. For example, as shown in FIG. 2, distillation column 212 takes an input stream and distills the into two cuts, a first cut going out the top of distillation column (not shown) and the second cut going out a bottom portion 213 of distillation column. Graphical process control loop display portion 240 details the bottom portion 213 of the process, in particular a bottom reboiler loop of distillation column 212. Measurement parameters 510-514 may correspond to process plant entities of the bottom reboiler loop/bottom portion 213 of distillation column 212. In particular, as shown in FIG. 5A, measurement parameter 510 corresponds to a bottoms flow rate of a process plant entity (FC701_03) with a value of 1.44 MBPD. Similarly, measurement parameter 512 corresponds to a bottoms composition parameter of a process plant entity (AC701_01) with a value of 50.2%. In addition, measurement parameter 514 corresponds to a bottoms level parameter of a process plant entity (AC701_01) with a value of 10.9%. As shown for measurement parameter 514, an alarm indicator may be shown in selectable display list 502 for measurement parameters that are above or below acceptable alarm states or threshold values. In the embodiment of FIG. 5A, a 10.9% value for the bottoms level of distillation column 212 is below an acceptable threshold value, thus causing mobile display navigation app 95 to render an alarm indicator with for measurement parameter 514. In some embodiments, the alarm associated with measurement parameter 514 may correspond to adorner graphic 239 shown in graphical process control loop display portion 240 for bottom reboiler loop/bottom portion 213 of distillation column 212.

Selecting measurement parameter 514 may cause mobile display navigation app 95 to zoom or focus the bottom portion 213 so that a user may better view additional details, values, or graphics of bottom reboiler loop/bottom portion 213 of distillation column 212. For example, additional information, such any or all of the measurement parameters of FIG. 6 may be rendered and displayed to the user.

Accordingly, the display auto-introspection routine, by analyzing full-size process plant display (e.g., a full-size process plant display 204) to determine visualizations of process modules as graphical process control loop display portions, exposes valuable information (e.g. measurement parameters) to operators of the process plant. In addition, this also allows operators to quickly and efficiently navigate to the value information on a display, e.g., where tapping on an item in a selectable display list (e.g., selectable display list 502) will automatically zoom the display to the visualization in the display.

In additional embodiments, an operator may control a process plant entity within the graphical process control loop display portion 240 by selecting the graphical representation of process plant entity on display screen 84 or by selecting a measurement parameter (e.g., a measurement parameter 510-514) from selectable display list 502. In such embodiments, the mobile user interface device 112 may receive a selection corresponding to a process plant entity of the plurality of process plant entities and the selection may initiate control of the process plant entity within the process plant (e.g., process plant 10).

Figure 5B:
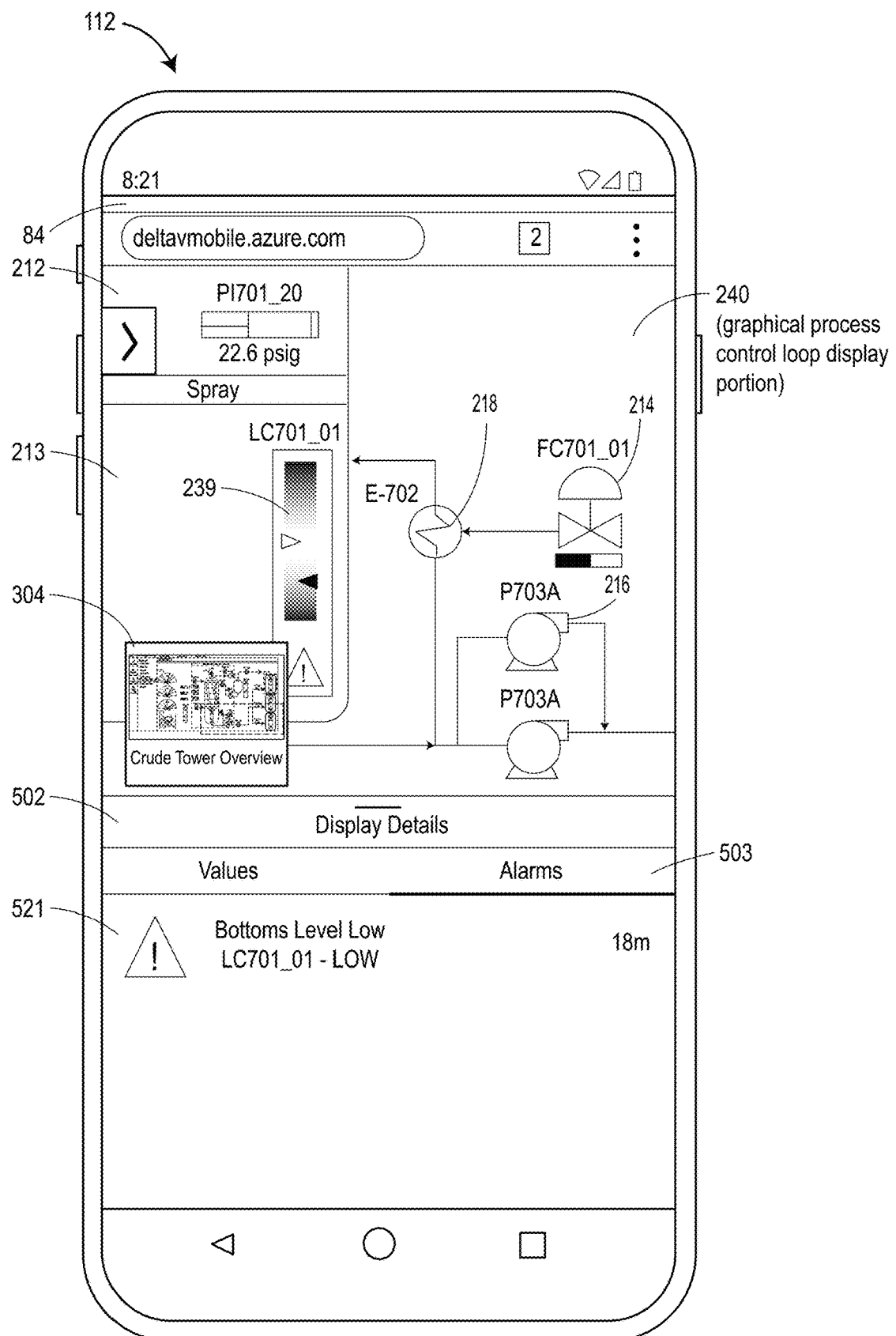
FIG. 5B is the mobile user interface device of FIG. 5A rendering the example graphical process control loop display portion of FIG. 5A, and also rendering an example selectable display list including an alarm indicator of one or more process plant entities depicted within the example graphical process control loop display portion.

FIG. 5B is the mobile user interface device 112 of FIG. 5A rendering the example graphical process control loop display portion 240 of FIG. 5A. FIG. 5B also depicts mobile user interface device 112 rendering an example selectable display list 503. Selectable display list 503 includes a listing of alarms currently active in graphical process control loop display portion 240. In the embodiment of FIG. 5B, mobile display navigation app 95 rendered a representation of alarm indicator 521 of a particular process plant entity on the display screen 84 of the mobile user interface device 112. In some embodiments, alarm indicator 521 may correspond to measurement parameter 514 of FIG. 5A and adorner graphic 239 FIG. 3A. As shown in FIG. 5B, alarm indicator 521 indicates and displays a reason for the alarm, i.e., that the Bottoms Level is LOW and that the alarm was triggered (e.g., by following below a threshold value) 18 minutes in the past. Alarm information may be displayed or triggered with respect to other or additional measurement parameters, values, etc., for example, including the measurement parameters of FIG. 6 as described herein.

As shown in FIG. 5B, graphical process control loop display portion 240 includes process plant entities selected from full-size process plant display 204. These include, for example, process plant entities 212-218 as described herein for FIG. 2. Mobile display navigation app 95 may also render overview panel 304 with graphical process control loop display portion 240, which operates the same manner as described herein for FIGS. 3A and 3B.

In some embodiments, Mobile display navigation app 95 may be configured to toggle among multiple graphical process control loop display portions. For example, a second graphical process control loop display portion (not shown) may comprise a different graphical process control loop display portion of full-size process plant display 204 than shown by graphical process control loop display portion 240. For example, a second graphical process control loop display portion may include a top portion of distillation column 212, as illustrated in FIG. 2. In such embodiments, the display auto-introspection routine may automatically detect the second graphical process control loop display portion depicted within the full-size process plant display 204. The second graphical process control loop display portion may include graphical representations of a second one or more process plant entities selected from the plurality of process plant entities of full-size process plant display 204. One or more processors (e.g., CPU 160 of server 150 or CPU 88 of mobile UI device 112) may generate a second selectable display list representing the second one or more process plant entities depicted within the second graphical process control loop display portion. The one or more processors may then transmit the second graphical process control loop display portion and the second selectable display list to a mobile user interface device 112. The mobile display navigation app may be configured to toggle rendering of the graphical process control loop display portion (e.g., graphical process control loop display portion 240) and rendering of the second graphical process control loop display portion (not shown) within the second area of the display screen of the mobile user interface device upon receiving a selection of the user from the display screen. The selection can be a swipe, or other gesture, or can be from a navigation panel (not shown) as described herein for FIGS. 3A and 3B. In such embodiments, rendering of the graphical process control loop display portion causes mobile display navigation app 95 to render the selectable display list in the first area of display screen 84. Similarly, rendering of the second graphical process control loop display portion causes mobile display navigation app 95 to render the second selectable display list in the first area of display screen 84.

FIG. 6 is a listing of example measurement parameters 602 of the one or more process plant entities of FIGS. 5A and 5B. In addition, measurement parameters may represent values or device diagnostic information that may be generated, controlled, measured, and/or displayed with respect to any of the embodiments of FIGS. 2, 3A, 3B, 5A, 5B, 8A, and/or 8B as described herein. For example, measurement parameters 602 represent key performance indicators (KPIs) associated with process plant entities process plant entities (e.g., process plant entities 15-22 and 40-46) of process plant 10. Measurement parameters (including measurement parameters 602) may be read, displayed, or otherwise visualized on any of the displays herein, including in real time or near-real time.

In the embodiment of FIG. 6, measurement parameters 602 may correspond to bottom reboiler loop/bottom portion 213 of distillation column 212 as described herein for FIGS. 5A and 5B. For example, as shown in FIG. 6, measurement parameters 602 include a bottoms flow rate 604 of process plant entity FC701_03 having a value of 1.44 MBDP that may flow to multiple destinations with the process plant 10 including T-721, T-722, and T-723. In addition, measurement parameters 602 include a bottoms level value 605 of process plant entity LC701_01 having a value of 0.5. Further, measurement parameters 602 include a lower control temperature 606 of process plant entity TC701_01 having a value of 668 degrees Fahrenheit. Further, measurement parameters 602 include a heater control for reboiler 607 of process plant entity FC701_01 having a value of 1000 feet cubed per second. Further, measurement parameters 602 include a bottoms composition 608 of process plant entity AC701_01 having a value of 0.5.

Any or all of measurement parameters 602 may be displayed on display screen 84 of a mobile user interface device 112. In various embodiments, greater or fewer of measurement parameters 602 may be displayed on display screen 84 as a zoom level is modified, for example, by a gesture command updating zoom level values causing a display to be zoomed in and out.

Figure 7:
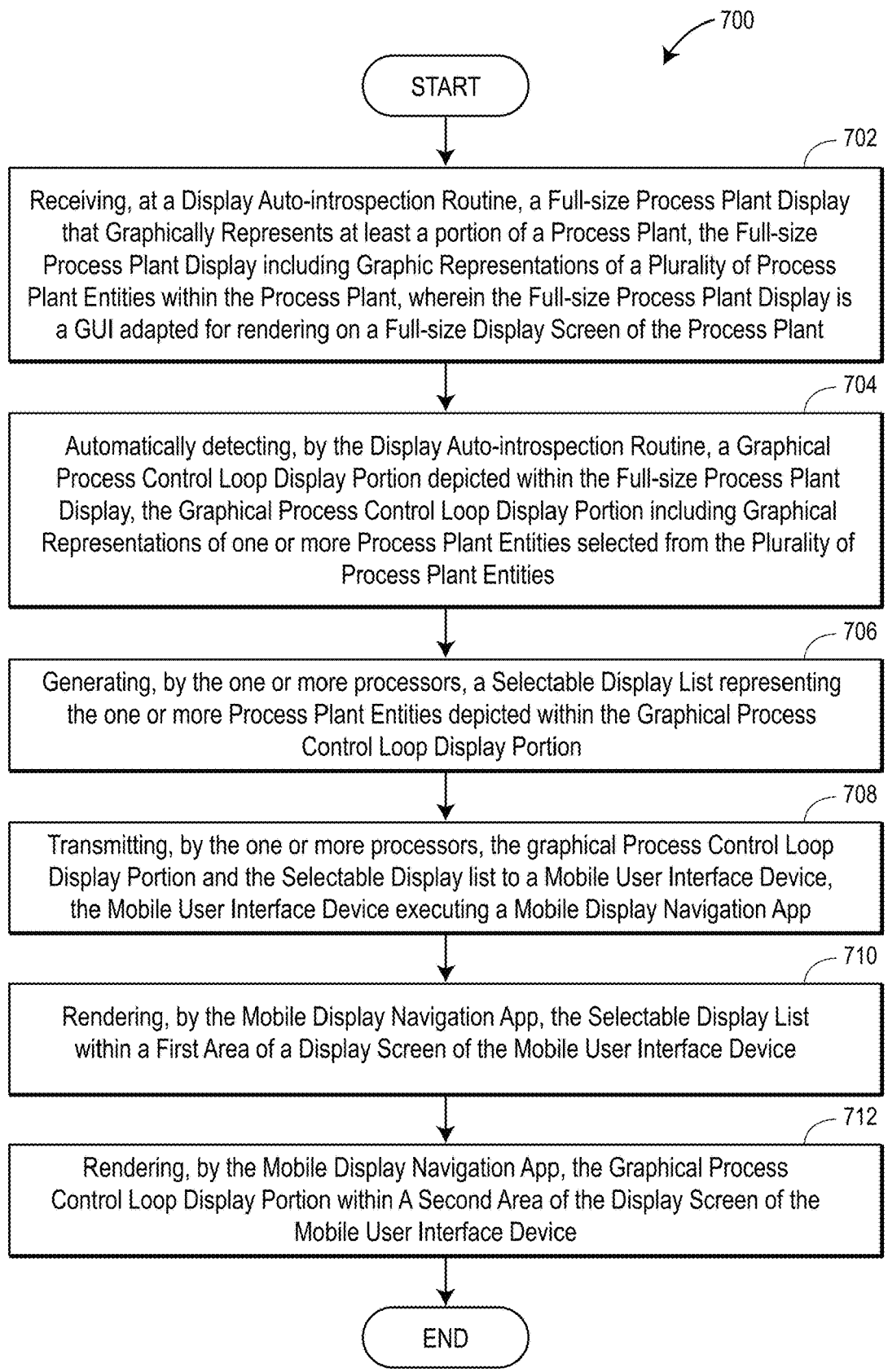
FIG. 7 is a flow diagram representing an exemplary GUI based method for automatically detecting, by a display auto-introspection routine, a graphical process control loop display portion depicted within a full-size process plant display, such as the example full-size process plant display of FIG. 2.

FIG. 7 is a flow diagram representing an exemplary GUI based method 700 for automatically detecting, by a display auto-introspection routine, a graphical process control loop display portion 240 depicted within a full-size process plant display, such as the example full-size process plant display of FIG. 2 (e.g., full-size process plant display 204). Method 700 may be used to generate the displays and embodiments of FIGS. 5A and 5B as described herein.

At block 702 display auto-introspection routine executing on one or more processors (e.g., CPU 88 of mobile user interface device 112 or CPU 160 of server 150) to receive a full-size process plant display (e.g., full-size process plant display 204) that graphically represents at least a portion of a process plant (e.g., process plant 10). The full-size process plant display (e.g., full-size process plant display 204) may include graphic representations (e.g., graphical process plant entities 212-218) of a plurality of process plant entities (e.g., process plant entities 15-22 and 40-46) within the process plant (e.g., process plant 10). In addition, the full-size process plant display (e.g., full-size process plant display 204) may comprise a GUI adapted for rendering on a full-size display screen (e.g., full-size display screen 202) of the process plant (e.g., process plant 10).

In various embodiments, display auto-introspection routine may be computer instructions and/or software stored in memory 90 of mobile user interface device 112 or memory 152 of server 150. In some embodiments, a graphical process control loop display portion may correspond to a process control module of a process plant (e.g., process plant 10). In such embodiments a display auto-introspection routine may analyze the process control module and detect or determine the graphical process control loop display portion from variables, functions, attributes, or other information of the process control module that correspond to graphics or visualizations of full-size process plant display 204. The display auto-introspection routine may then determine the view portion of full-size process plant display 204 that maps to the graphical process control loop display portion and that may be transmitted to mobile display navigation app 95 for rendering on mobile user interface device 112 as describe herein.

At block 704, the display auto-introspection routine automatically detects a graphical process control loop display portion (e.g., graphical process control loop display portion 240) depicted within the full-size process plant display (e.g., full-size process plant display 204). The graphical process control loop display portion (e.g., graphical process control loop display portion 240) may include graphical representations of one or more process plant entities (e.g., graphical process plant entities 212-218) selected from the plurality of process plant entities.

At block 706, the one or more processors (e.g., of mobile UI device 112 and/or server 150) generates a selectable display list (e.g., selectable display list 502 of FIG. 5A) representing the one or more process plant entities depicted within the graphical process control loop display portion (e.g., graphical process control loop display portion 240).

At block 708 the one or more processors (e.g., of mobile UI device 112 and/or server 150) transmit the graphical process control loop display portion (e.g., graphical process control loop display portion 240) and the selectable display list (e.g., selectable display list 502 of FIG. 5A) to a mobile user interface device 112. In various embodiments, the mobile user interface device may execute a mobile display navigation app (e.g., mobile display navigation app 95).

At block 710 mobile display navigation app 95 may render the selectable display list (e.g., selectable display list 502 of FIG. 5A) within a first area of a display screen 84 of the mobile user interface device 112.

At block 712 mobile display navigation app 95 may render the graphical process control loop display portion (e.g., graphical process control loop display portion 240) within a second area of the display screen 84 of the mobile user interface device 112.

In various embodiments, the mobile display navigation app 95 may be adapted to, upon receiving a selection from the selectable display list (e.g., selectable display list 502 of FIG. 5A) corresponding to a particular process plant entity (e.g., distillation column 212) of the or more process plant entities, adjust a zoom level to focus the particular process plant entity e.g., distillation column 212) within the graphical process control loop display portion (e.g., graphical process control loop display portion 240) as displayed in the second area of the display screen 84 of the mobile user interface device 112, for example, as described herein with respect to FIG. 5A.

Full-Size Process Plant Display Refactoring

The present disclosure further provides GUI based systems and methods for refactoring full-size process plant displays at various zoom and detail levels for visualization on mobile user interface devices. In particular, such GUI based systems and methods allow mobile user interface devices 112, and users thereof, to visualize process data, measurement parameters, alarm information, or other information at different zoom and detail levels as descried herein by refactoring an existing full-size process plant display (e.g., full-size process plant display 204) in real-time or near real-time on a mobile user interface device 112. Such systems and methods for refactoring full-size process plant displays may be deployed and/or implemented in existing mobile applications and/or process plant based applications and products such as DeltaV™ Mobile and/or DeltaV™ Live as provided Emerson Process Management.

Figure 8A:
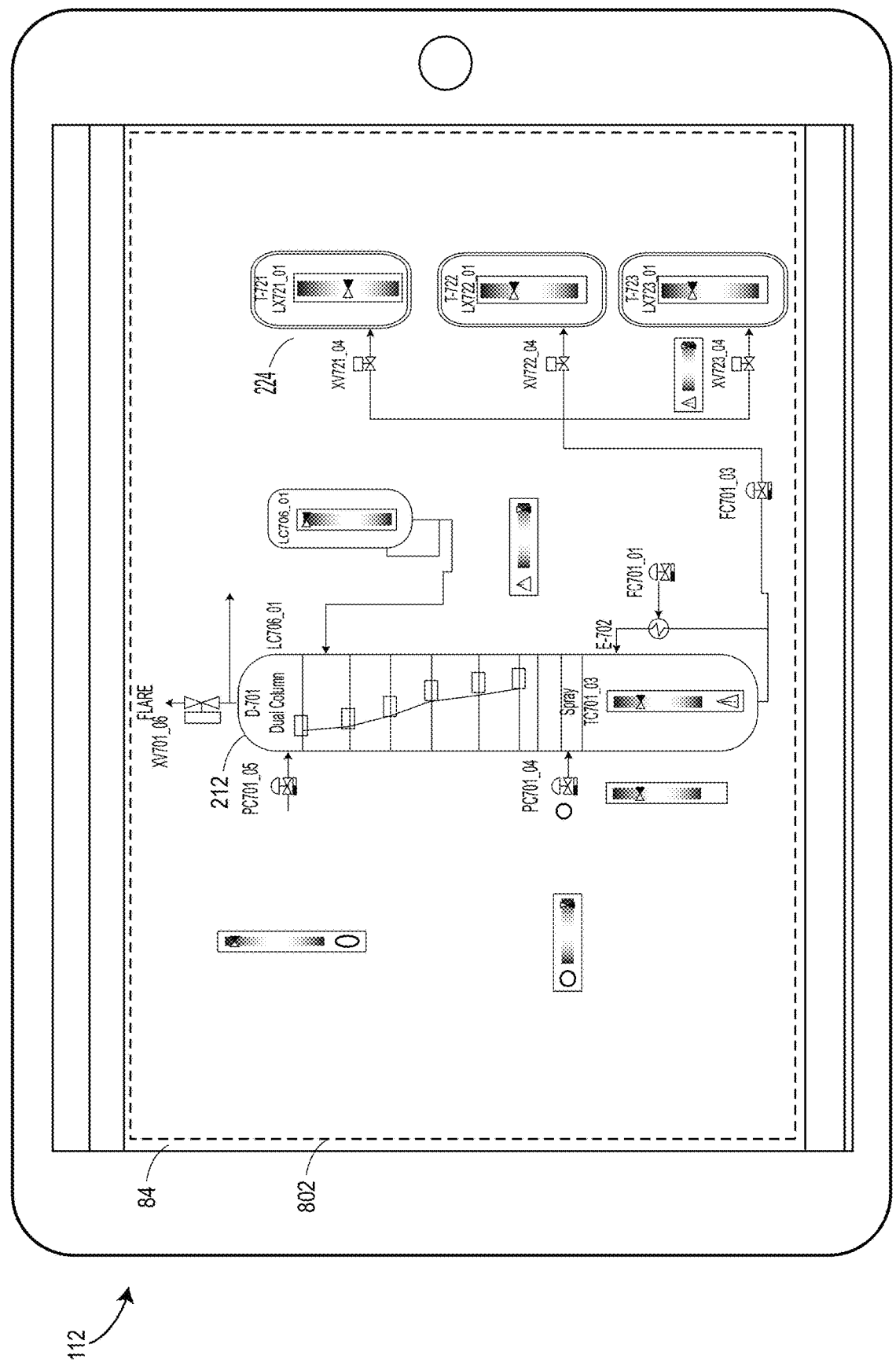
FIG. 8A is an embodiment of a mobile user interface device rendering, on a display screen of the mobile user interface device, a first view portion of the example full-size process plant display of FIG. 2, the first view portion defining a first zoom level and a first detail level of a process plant entity.
Figure 8B:
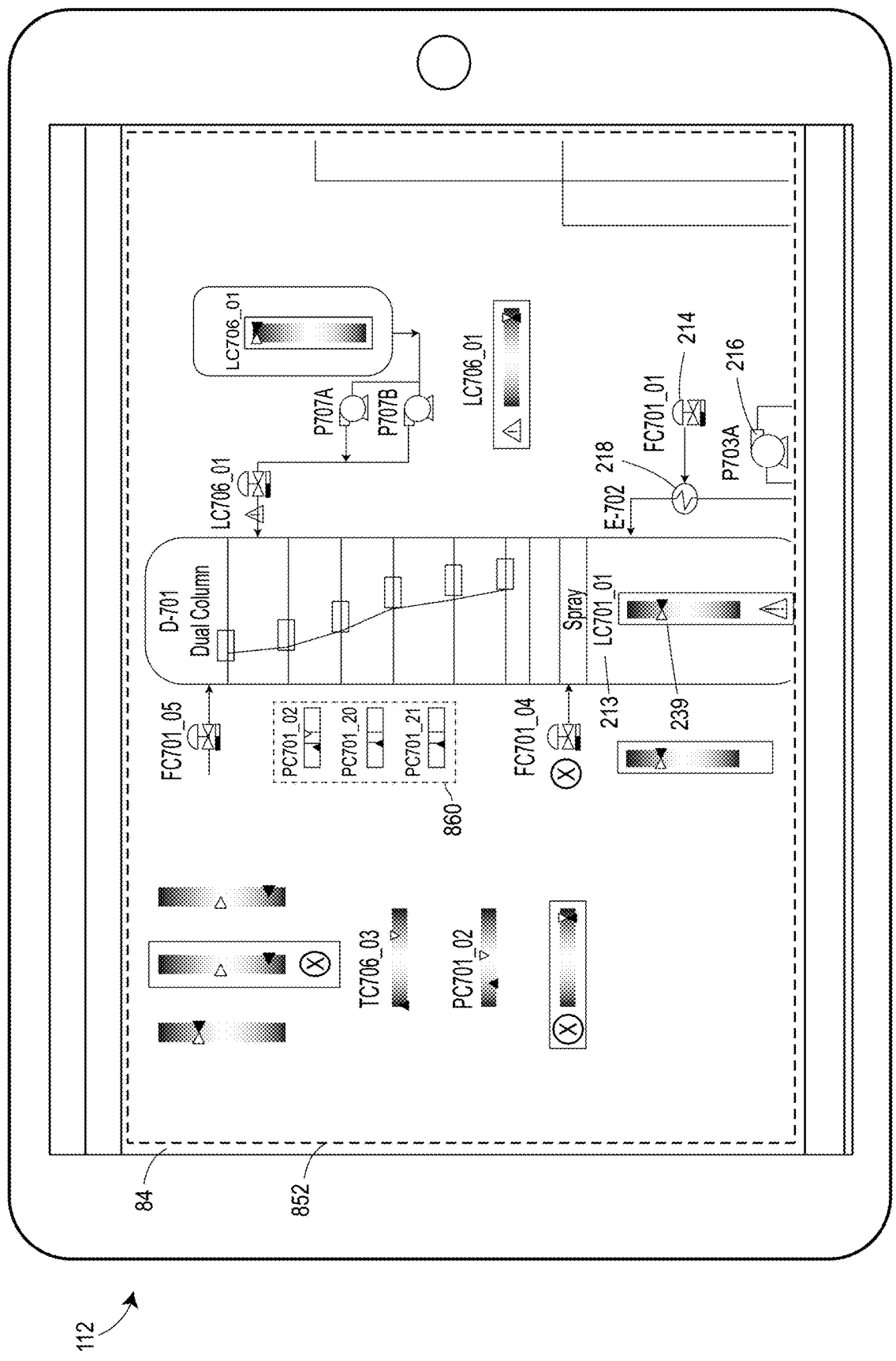
FIG. 8B is the mobile user interface device of FIG. 8A rendering a second view portion of the example full-size process plant display of FIG. 2, the second view portion defining a second zoom level and a second detail level of a process plant entity.

FIG. 8A and FIG. 8B represent an example embodiment of full-size process plant display refactoring. FIGS. 8A and 8B depict a user interface device 112 as a tablet device displaying a refactored visualization of full-size process plant display 204 of FIG. 2. In the embodiments of FIGS. 8A and 8B the surface area of the display screen 84 of the mobile user interface device 112 is less than half the full-size surface area of the full-size display screen 202 of FIG. 2.

FIG. 8A is an embodiment of a mobile user interface device 112 rendering, on a display screen 84, a first view portion 802 of the example full-size process plant display 204 of FIG. 2. First view portion 802 defines a first zoom level and a first detail level of a process plant entity (e.g., distillation column 212). In the embodiment of FIG. 8A, first view portion 802 is displayed on the display screen 84 in a "zoomed-out," lower resolution view when compared to second view portion 852 of FIG. 8B as described further herein.

In each of FIGS. 8A and 8B, each of first view portion 802 and second view portion 852 is sized to render fully on the display screen 84 of the mobile user interface device 112 such that the entire or nearly entire surface area of the display screen 84 is occupied by each of first view portion 802 and second view portion 852, respectively. This allows for a greater zoom and detail level for each of first view portion 802 and second view portion 852 when compared with a fully zoomed-out view of full-size process plant display 204 that shows all of the process plant entities of process plant display 204. That is, when the first view portion 802 and second view portion 852 are fully displayed, mobile user interface device 112 does not display, and mobile display navigation app 95 does not render, all of the visualizations or graphics of full-size process plant display 204. For this reason, the GUI based systems and methods for refactoring full-size process plant displays at various zoom and detail levels improves the performance of mobile user interface devices 112 by allowing the user interface device 112 and mobile display navigation app 95 to render fewer visualizations and/or graphics thereby improving the performance of user interface device 112 by reducing the required processing power (e.g., of CPU 88) and memory (e.g., memory 90) usage required by a user interface device 112.

FIGS. 8A and 8B includes embodiments regarding automatic refactoring of graphics of full-size process plant display 204, which, at least in some embodiments, may be natively integrated with a process control network (e.g., process control network 100) for various mobile device screen sizes and resolutions. In the embodiments of 8A and 8B, mobile device command gestures on display screen 84 of mobile user interface device 112 causes a request for graphics and/or data (e.g., real-time or near real-time graphics or data) from server 150. Mobile display navigation app 95 may then render the graphics and data rendered on display screen 84 of mobile user interface device 112. In this way, a view portion (such as first view portion 802 and/or second view portion 802) may represent a "live snap shot" of the actual data and/or state of various process plant entities of process plant 10.

In addition, specific (e.g., programmatically-defined or user-defined) view portions of graphics and/or data may be rendered based on the display screen 84 size of the 112 that is accessing the graphics and/or data from server 150.

In some embodiments, a full-size process plant display 204, as displayed in FIG. 8A, may be a comprehensive representation of a process plant (e.g., process plant 10) that may include most or all process plant entities. In other embodiments, however, a full-size process plant display 204 (e.g., as displayed in FIG. 8A) may be a less comprehensive representation of a process plant that may include only a portion of process plant and its related process plant entities. In some embodiments, full-size process plant display 204 (e.g., as displayed in FIG. 8A) may be natively integrated with a process control network of the process plant where, for example, full-size process plant display 204 is collocated within the process plant (e.g., process plant 10) and/or used to monitor or control the process plant and/or its process control network.

In further embodiments, mobile UI device 112 may be confirmed to receive a selection corresponding to a process plant entity (e.g., distillation column 212). The selection may initiate control of the process plant entity within the process plant (e.g., process plant 10). For example, as shown in FIGS. 8A and 8B, mobile display navigation app 95 may receive a selection on display screen 84 corresponding to a location of distillation column 212. The selection may cause a control window (not shown) to be displayed on display screen 84. The control window may include graphic controls and/or input boxes to receive commands or input. For example, in the embodiment of FIG. 3A, a control window may receive a command to adjust a parameter of distillation column 212 in response to the alarm adorner graphic 239 on display screen 84. The command may be transmitted to server 150, where server 150 may transmit the command to distillation column 212 via process control network 100. In some embodiments the command may be sent via a voice command, where mobile user interface device 112 receives an audible instruction (voice) at a microphone (not shown) of mobile UI device 112 and where processor (e.g., CPU 88) converts (e.g., via natural language processing) the audible instruction to the command that is sent to server 150 to adjust a parameter of distillation column 212 as described above herein. In this way monitoring and control of a process plant (e.g., process plant 10) is feasible on a small screen device such mobile user interface device 112 as describe herein.

FIG. 8B is the mobile user interface device 12 of FIG. 8A rendering a second view portion 852 of the example full-size process plant display (e.g., full-size process plant display 204) of FIG. 2, the second view portion 852 defining a second zoom level and a second detail level of a process plant entity (e.g., distillation column 212). Second view portion 852 represents a "zoomed-in" and/or more focused zoom level having a greater detail level than compared to first view portion 802 of FIG. 8A. In various embodiments herein, including those of FIGS. 8A and 8B, mobile touch gestures, such as pinch, swipe, and/or zoom may cause screen (e.g., display screen 84) content changes, such as lower/higher resolutions and/or details of graphics and/or data as a user zooms in and out to various view portions (e.g., first view portion 802 and second view portion 802).

As shown for FIG. 8B, mobile display navigation app 95 renders second view portion 852 with a focused view (e.g., a more detailed view and/or greater resolution view) of the process plant entity (e.g., distillation column 212) at the second zoom level of second view portion 802 compared with the first zoom level of second view portion 852. The focused view of second view portion 852 includes greater detail/higher resolution graphics and measurement parameters of process plant 10 than compared with first view portion 802. For example, zooming to second view portion 852 causes mobile display navigation app 95 to render detail information including bottom portion 213 of distillation column 212, adorner graphic 239, and additional measurement parameters 860 (e.g., which may be any of measurement parameters 602).

As shown for FIGS. 8A and 8B, first view portion 802 comprises a first graphic resolution and second view portion 852 comprises a second graphic resolution. In some embodiments, first graphic resolution of first view portion 802 may be different from second graphic resolution of second view portion 852. In other embodiments, first graphic resolution and second graphic resolution are the same, but are rendered, by mobile display navigation app 95, at different zoom levels. In still further embodiments, mobile display navigation app 95 may determine each of the first graphic resolution and the second graphic resolution based on a size of the display screen 84 of the mobile user interface device 112. In such embodiments, a mobile user interface device 112 with a larger screen size may be configured with a larger or greater resolution view portion than a mobile user interface device 112 with a smaller screen size.

In addition, mobile display navigation app 95 renders, on the display screen 84 of the mobile user interface device 112, detail information of the process plant entity (e.g., distillation column 212) at the second detail level. In various embodiments, detail information may include at least one of an alarm adorner graphic (e.g., adorner graphic 239) or a measurement parameter (e.g., measurement parameters 602) of the process plant entity. In some embodiments, mobile display navigation app 95 renders, on the display screen 84 of the mobile user interface device 112, the detail information in real time or near-real time. For example, the detail information may be retrieved from server 150 by a request from mobile user interface device 112 as described herein.

More generally, as shown for FIGS. 8A and 8B, graphics and data may be rendered and displayed on display screen 84 at various levels of detail and/or resolution depending on screen resolution. In such embodiments, level of detail may automatically adjust depending on the mobile device screen size or resolution, and mobile pinch/zoom touch gestures as received from a user on display screen 84. For example, on a small screen size with low resolution (e.g., the tablet device of FIG. 8A), only a few parameters will be shown. To see more detail, a user may use touch gestures to zoom in or out, causing the data and graphics to be refactored (e.g., re-fetched from server 150 or re-rendered where full-size process plant display 204 is within memory 90 of mobile user interface device 112) to display different and/or higher-resolution content. In such embodiments, mobile display navigation app 95 would first render a lower resolution view for smaller mobile screen sizes, and a more detailed view with higher resolution content as the user zooms in. In this way, a user may adjust any of graphical detail, measurement parameter detail on the screen where the current zoom level corresponds to the current detail level of information displayed on display screen 84. A user of a mobile user interface device 112 may thus view process or alarm information on display screen 84 that is native within a process control system (e.g., process control network 100) in an efficient manner on a mobile user interface device 112 having a small screen.

In some embodiments, each of the zoom levels are defined by different graphical view layers. In such embodiments, a full-size process plant display (e.g., full-size process plant display 204) may be comprised of a plurality of graphical view layers. For example, for FIGS. 8A and 8B, first view portion 802 may be associated with a first graphical layer having a first zoom range second view portion 852 may be associated with a second graphical layer having a second zoom range. Mobile display navigation app 95, upon receiving a gesture command from mobile user interface device 112, detects a transition from the first zoom range to the second zoom range. The detected transition may correspond to a length or degree of a swipe, pinch, or other such gesture command. The transition command, based on the length or degree, may cause the mobile display navigation app 95 to render second view portion 852 at the second graphical layer on display screen 84.

In particular embodiments, graphical view layers or layouts could be generated from full-size process plant display 204 based on type of device. For example, a "mobile phone view," such as a mobile phone graphical view layer or layout can be configured by a user or automatically determined (e.g., by regionizer 158). In such embodiments a view portion corresponding to a shape or area of a given mobile user interface device 112 may be determined and generated as a graphical view layer, layout, and/or region. As an additional example, a "tablet view" graphical view layer or layout could be generated based on full-size process plant display 204, which would show greater detail of full-size process plant display 204 where the tablet screen size is larger than the mobile phone screen size for the "mobile phone view." When a user accesses full-size process plant display 204 by opening it from mobile user interface device 112, the view that is displayed may be based on auto-detection of the mobile device type. In such embodiments, if the user is on a tablet, the "tablet view" automatically appears. If the user is on a mobile phone, the "mobile phone view" automatically appears.

In additional embodiments, server 150 and/or mobile user interface device 112 may be configured to receive, a configuration command causing the server 150 and/or mobile user interface device 112 to execute instructions to (a) predefine a graphic resolution of a view portion (e.g., first view portion 802 and/or second view portion 852); (b) modify detail information of a view portion (e.g., for first view portion 802 and/or second view portion 852); and/or or (c) define a set of view layers (e.g., for first view portion 802 and/or second view portion 852) associated with the first zoom level and the second zoom level of the view portion(s). Accordingly, such configuration options, e.g., by a configuration command, allows a user or program application to select areas of an operator graphic that would automatically appear as scrollable pages on a mobile device. The areas are selectable in sizes that mirror sizes and resolutions of phone and tablet screens, and when a mobile device initiates a browser or native mobile app, the screen size of the mobile device app may be automatically detected, and the graphics may be rendered in a resolution and/or size that matches the mobile device.

Figure 9:
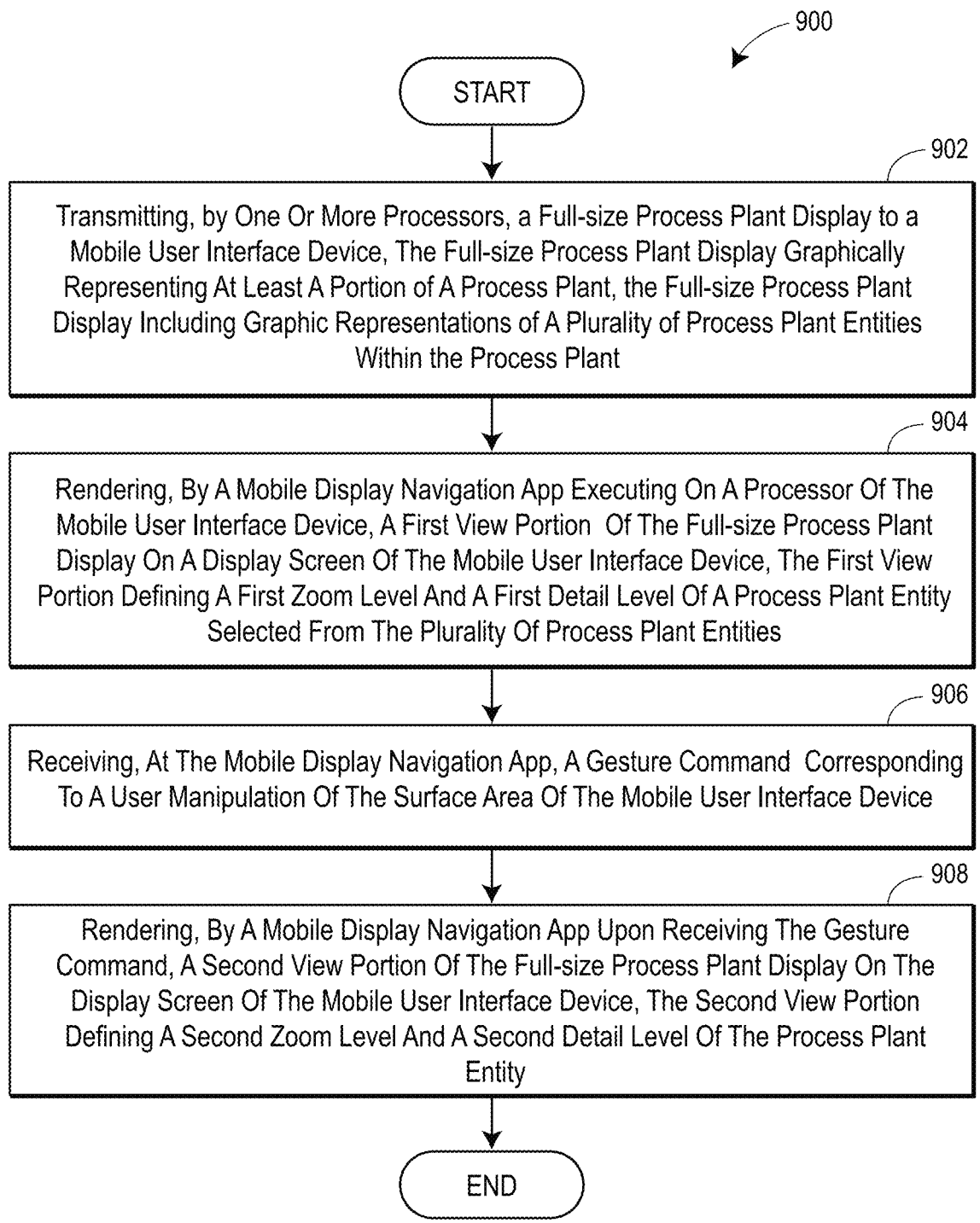
FIG. 9 is a flow diagram representing an exemplary GUI based method for refactoring full-size process plant displays, such as the example full-size process plant display of FIG. 2, at various zoom and detail levels for visualization on mobile user interface devices, such as depicted by FIGS. 8A and 8B.

FIG. 9 is a flow diagram representing an exemplary GUI based method 900 for refactoring full-size process plant displays (e.g., full-size process plant display 204) at various zoom and detail levels for visualization on mobile user interface devices 112 such as depicted and described herein for FIGS. 8A and 8B.

At block 902, method 900 includes transmitting, by one or more processors (e.g., CPU 160 of server 150), a full-size process plant display (e.g., full-size process plant display 204) to a mobile user interface device 112. The full-size process plant display (e.g., full-size process plant display 204) may graphically represent at least a portion of a process plant (e.g., process plant 10). In addition, the full-size process plant display (e.g., full-size process plant display 204) may include graphic representations of a plurality of process plant entities (e.g., process plant entities 15-22 and 40-46) within the process plant (e.g., process plant 10). In various embodiments, the a full-size process plant display 202 is a GUI adapted for rendering on a full-size display screen (e.g., full-size display screen 202) of the process plant (e.g., process plant 10)

At block 904 method 900 may include rendering, by a mobile display navigation app (e.g., mobile display navigation app 95), executing on a processor (e.g., CPU 88) of the mobile user interface device 112, a first view portion (e.g., first view portion 802) of the full-size process plant display (e.g., full-size process plant display 204) on a display screen 84 of the mobile user interface device 112. The first view portion (e.g., 802) may define a first zoom level and a first detail level of a process plant entity (e.g., 212) selected from the plurality of process plant entities (e.g., process plant entities 212-218). In various embodiments, the display screen 84 of the mobile user interface device 112 may comprise a surface area that is less than a full-size surface area of the full-size display screen (e.g., full-size display screen 202).

At block 906 method 900 may further include receiving, at the mobile display navigation app (e.g., mobile display navigation app 95), a gesture command (e.g., touch, pinch, swipe gesture) corresponding to a user manipulation (e.g., corresponding to the length or force of a touch, pinch or swipe gesture) of the surface area of the mobile user interface device 112.

At block 908 method 900 may further include rendering, by a mobile display navigation app (e.g., mobile display navigation app 95) upon receiving the gesture command, a second view portion (e.g., second view portion 802) of the full-size process plant display (e.g., full-size process plant display 204) on the display screen 84 of the mobile user interface device 112. The second view portion (e.g., second view portion 852) may define a second zoom level and a second detail level of the process plant entity (e.g., process plant 10). In various embodiments, the first zoom level may differ from the second zoom level, and/or the first detail level may differ from the second detail level.

In some embodiments, a full-size process plant display (e.g., full-size process plant display 204) may a browser based display (e.g., an HTML 5 browser based display comprised of HTML 5 browser-based graphics and/or instructions). In such embodiments, the mobile display navigation app (e.g., mobile display navigation app 95) may comprise a browser, such as a web browser for receiving the HTML based graphics and/or instructions. The browser (e.g., mobile display navigation app 95) may render the first view portion (e.g., first view portion 802) on the display screen 84 of the mobile user interface device 112. In such embodiments, receiving a gesture command at the browser (e.g., mobile display navigation app 95)/display screen 84, may cause the browser to execute instructions requesting electronic transmission of the detail information (e.g., graphics, such as vector based information/image or rasterized images, and/or data such as measurement parameters) from a server (e.g., server 150) associated with the process plant (e.g., process plant 10). Upon receiving the detail information, the browser (e.g., mobile display navigation app 95) may then render a second view portion (e.g., second view portion 802) with the detail information.

In further embodiments, mobile display navigation app (e.g., mobile display navigation app 95) comprises a native mobile app (e.g., an Apple iOS or Google Android application). The native mobile app may render the first view portion (e.g., first view portion 802) on the display screen 84 of the mobile user interface device 112. In such embodiments, receiving a gesture command at the native mobile app (e.g., mobile display navigation app 95)/display screen 84, may cause the browser to execute instructions requesting electronic transmission of the detail information (e.g., graphics, such as vector based information/image or rasterized images, and/or data such as measurement parameters) from a server (e.g., server 150) associated with the process plant (e.g., process plant 10). Upon receiving the detail information, the native app (e.g., mobile display navigation app 95) may then render a second view portion (e.g., second view portion 802) with the detail information.

Aspects of the Present Disclosure

Regionizer Aspects

1. A graphical user interface (GUI) based method for regionizing full-size process plant displays for rendering on mobile user interface devices, the GUI based method comprising: receiving, at a regionizer application (app) executing on one or more processors, a full-size process plant display that graphically represents at least a portion of a process plant, the full-size process plant display including graphic representations of a plurality of process plant entities within the process plant, wherein the full-size process plant display is a GUI adapted for rendering on a full-size display screen of the process plant; determining, by the regionizer app, one or more display regions of the full-size process plant display, each of the one or more display regions defining a view portion of the full-size process plant display, and each of the one or more display regions including at least one graphical representation of a process plant entity selected from the plurality of process plant entities; transmitting, by the one or more processors, the one or more display regions to a mobile user interface device, the mobile user interface device executing a mobile display navigation app; and rendering, by the mobile display navigation app, each of the one or more display regions on a display screen of the mobile user interface device, wherein the display screen of the mobile user interface device comprises a surface area that is less than a full-size surface area of the full-size display screen.

2. The GUI based method of aspect 1, further comprising: transmitting, by the one or more processors, the full-size process plant display to the mobile user interface device, wherein the mobile display navigation app of the mobile user interface device renders the one or more display regions on the display screen of the mobile user interface device by bounding the view portion of each of the one or more display regions to the full-size process plant display.

3. The GUI based method of aspect 1, further comprising generating, by the one or more processors, one or more new displays based on the determining of the one or more display regions of the full-size process plant display, each new display corresponding to the view portion of its corresponding display region, wherein the transmitting the one or more display regions to the mobile user interface device comprises transmitting the one more new displays to the mobile user interface device, and wherein the mobile display navigation app of the mobile user interface device renders the one or more new displays on the display screen of the mobile user interface device.

4. The GUI based method of any of the aforementioned aspects, wherein the determining of the one or more display regions of the full-size process plant display comprises the regionizer app receiving one or more user selections defining one or more corresponding locations of the one or more display regions within the full-size process plant display.

5. The GUI based method of any of the aforementioned aspects, wherein the determining of the one or more display regions of the full-size process plant display comprises the regionizer app automatically detecting positions of the one or more display regions within the full-size process plant display.

6. The GUI based method of aspect 5, wherein each of the one or more display regions are detected based on a frequency of access the view portion of each of the one or more display regions of the full-size process plant display.

7. The GUI based method of any of the aforementioned aspects, wherein each of the one or more display regions are associated with a variable zoom level value that corresponds to a detail level of the view portion of each of the one or more display regions of the full-size process plant display.

8. The GUI based method of aspect 7, wherein the one or more display regions comprise at least a first display region and a second display region, wherein the mobile user interface device renders the first display region at a first zoom level and the second display region at a second zoom level, the first zoom level being different from the second zoom level.

9. The GUI based method of any of the aforementioned aspects, wherein the one or more display regions comprise at least a first display region and a second display region, wherein the first display region is sequentially ordered with respect to the second display region, the mobile user interface device adapted to render the first display region before the second display region.

10. The GUI based method of aspect 9, wherein each of the one or more display regions is rendered by the mobile user interface device with a navigational panel, the navigational panel configured to receive a selection to toggle rendering of the first display region and rendering of the second display region on the display screen of the mobile user interface device.

11. The GUI based method of any of the aforementioned aspects, further comprising: accessing, by the regionizer app, a predefined GUI profile comprising GUI settings, the GUI settings defining at least one of a quantity of one or more display regions, one or more locations within the full-size process plant display of the one or more display regions, or one or more zoom levels of the one or more display regions; and transmitting the GUI settings to the mobile user interface device, wherein the mobile user interface device is adapted to configure the one or more display regions based on the GUI settings.

12. The GUI based method of aspect 11, wherein the predefined GUI profile is determined based on one or more selections provided by a user.

13. The GUI based method of aspect 11, wherein the predefined GUI profile is determined based a device type of the mobile user interface device.

14. The GUI based method of any of the aforementioned aspects, wherein the view portion of at least one of the one or more display regions is sized to render fully on the display screen of the mobile user interface device.

15. The GUI based method of any of the aforementioned aspects, wherein the surface area of the display screen of the mobile user interface device is less than half the full-size surface area of the full-size display screen.

16. The GUI based method of any of the aforementioned aspects, wherein the full-size process plant display is a comprehensive representation of the process plant.

17. The GUI based method of any of the aforementioned aspects, wherein at least one display region includes an alarm adorner graphic or a measurement parameter of a process plant entity selected from the plurality of process plant entities.

18. The GUI based method of aspect 17, wherein the mobile display navigation app is configured to render the alarm adorner graphic or measurement parameter in real-time or near-real time.

19. The GUI based method of any of the aforementioned aspects, wherein at least one display region includes a video stream or an image of a process plant entity.

20. The GUI based method of any of the aforementioned aspects, wherein at least one display region includes an overview panel indicating a location of the at least one display region within the full-size process plant display.

21. The GUI based method of any of the aforementioned aspects, wherein the full-size process plant display is natively integrated with a process control network of the process plant.

22. The GUI based method of any of the aforementioned aspects further comprising: receiving a selection from the mobile user interface device, the selection corresponding to a process plant entity of the plurality of process plant entities, and wherein the selection initiates control of the process plant entity within the process plant.

23. The GUI based method of any of the aforementioned aspects further comprising: automatically detecting, by a display auto-introspection routine executing on the one or more processors, a graphical process control loop display portion depicted within the full-size process plant display, wherein the determination of the one or more display regions comprises defining a particular display region as the graphical process control loop display portion; generating, by the regionizer app or the mobile display navigation app, a selectable display list representing one or more process plant entities depicted within the graphical process control loop display portion; rendering, by mobile display navigation app, the selectable display list within a first area of the display screen of the mobile user interface device; and rendering, by the mobile display navigation app, the graphical process control loop display portion within a second area of the display screen of the mobile user interface device, wherein the mobile display navigation app is adapted to, upon receiving a selection from the selectable display list corresponding to a particular process plant entity of the or more process plant entities, adjust a zoom level to focus the particular process plant entity within the graphical process control loop display portion.

24. The GUI based method of aspect 23 further comprising: rendering, by the mobile display navigation app, a representation of one or more measurement parameters of the particular process plant entity on the display screen of the mobile user interface device.

25. The GUI based method of aspect 23 further comprising: rendering, by the mobile display navigation app, a representation of one or more alarm indicators of the particular process plant entity on the display screen of the mobile user interface device.

26. A graphical user interface (GUI) based system configured to regionize full-size process plant displays for rendering on mobile user interface devices, the GUI based system comprising: a server comprising one or more processors, the server communicatively coupled to a process control network of a process plant comprising a plurality of process plant entities; a regionizer application (app) executing on the one or more processors, the regionizer app configured to determine one or more display regions of a full-size process plant display, each of the one or more display regions defining a view portion of the full-size process plant display, and each of the one or more display regions including at least one graphical representation of a process plant entity selected from the plurality of process plant entities, wherein the full-size process plant display is a GUI adapted for rendering on a full-size display screen of the process plant; and a mobile display navigation app executing on one or more processors of a mobile user interface device, wherein the mobile user interface device is configured to receive the one or more display regions, wherein the mobile display navigation app is configured to render each of the one or more display regions on a display screen of the mobile user interface device, and wherein the display screen of the mobile user interface device comprises a surface area that is less than a full-size surface area of the full-size display screen.

27. The GUI based system of aspect 26, where the one or more processors are configure to transmit the full-size process plant display to the mobile user interface device, and wherein the mobile display navigation app of the mobile user interface device renders the one or more display regions on the display screen of the mobile user interface device by bounding the view portion of each of the one or more display regions to the full-size process plant display.

28. The GUI based system of aspect 26, wherein the one or more processors are configured to generate one or more new displays based on the determining of the one or more display regions of the full-size process plant display, each new display corresponding to the view portion of its corresponding display region, wherein the transmitting the one or more display regions to the mobile user interface device comprises transmitting the one more new displays to the mobile user interface device, and wherein the mobile display navigation app of the mobile user interface device renders the one or more new displays on the display screen of the mobile user interface device.

29. The GUI based system of any one or more of aspects 26 to 28, wherein the determining of the one or more display regions of the full-size process plant display comprises the regionizer app receiving one or more user selections defining one or more corresponding locations of the one or more display regions within the full-size process plant display.

30. The GUI based system of any one or more of aspects 26 to 29, wherein the determining of the one or more display regions of the full-size process plant display comprises the regionizer app automatically detecting positions of the one or more display regions within the full-size process plant display.

31. The GUI based system of aspect 30, wherein each of the one or more display regions are detected based on a frequency of access the view portion of each of the one or more display regions of the full-size process plant display.

32. The GUI based system of any one or more of aspects 26 to 31, wherein each of the one or more display regions are associated with a variable zoom level value that corresponds to a detail level of the view portion of each of the one or more display regions of the full-size process plant display.

33. The GUI based system of aspect 32 wherein the one or more display regions comprise at least a first display region and a second display region, wherein the mobile user interface device renders the first display region at a first zoom level and the second display region at a second zoom level, the first zoom level being different from the second zoom level.

34. The GUI based system of any one or more of aspects 26 to 33, wherein the one or more display regions comprise at least a first display region and a second display region, wherein the first display region is sequentially ordered with respect to the second display region, the mobile user interface device adapted to render the first display region before the second display region.

35. The GUI based system of aspect 34 wherein each of the one or more display regions is rendered by the mobile user interface device with a navigational panel, the navigational panel configured to receive a selection to toggle rendering of the first display region and rendering of the second display region on the display screen of the mobile user interface device.

36. The GUI based system of any one or more of aspects 26 to 35 the regionizer app is configured to access a predefined GUI profile comprising GUI settings, the GUI settings defining at least one of a quantity of one or more display regions, one or more locations within the full-size process plant display of the one or more display regions, or one or more zoom levels of the one or more display regions, wherein the one or more processors are configured to transmit the GUI settings to the mobile user interface device, and wherein the mobile user interface device is adapted to configure the one or more display regions based on the GUI settings.

37. The GUI based system of aspect 36, wherein the predefined GUI profile is determined based on one or more selections provided by a user.

38. The GUI based system of aspect 36, wherein the predefined GUI profile is determined based a device type of the mobile user interface device.

39. A tangible, non-transitory computer-readable medium storing instructions for regionizing full-size process plant displays for rendering on mobile user interface devices, that when executed by one or more processors of a computing device cause the computing device to: receive, at a regionizer application (app) executing on one or more processors, a full-size process plant display that graphically represents at least a portion of a process plant, the full-size process plant display including graphic representations of a plurality of process plant entities within the process plant, wherein the full-size process plant display is a GUI adapted for rendering on a full-size display screen of the process plant; determine, by the regionizer app, one or more display regions of the full-size process plant display, each of the one or more display regions defining a view portion of the full-size process plant display, and each of the one or more display regions including at least one graphical representation of a process plant entity selected from the plurality of process plant entities; transmit, by the one or more processors, the one or more display regions to a mobile user interface device, the mobile user interface device executing a mobile display navigation app; and render, by the mobile display navigation app, each of the one or more display regions on a display screen of the mobile user interface device, wherein the display screen of the mobile user interface device comprises a surface area that is less than a full-size surface area of the full-size display screen.

Display Auto-Introspection Aspects

40. A guided user interface (GUI) based method for automatically detecting graphical process control loop display portions within full-size process plant displays for rendering on mobile user interface devices, the GUI based method comprising: receiving, at a display auto-introspection routine executing on one or more processors, a full-size process plant display that graphically represents at least a portion of a process plant, the full-size process plant display including graphic representations of a plurality of process plant entities within the process plant, wherein the full-size process plant display is a GUI adapted for rendering on a full-size display screen of the process plant; automatically detecting, by the display auto-introspection routine, a graphical process control loop display portion depicted within the full-size process plant display, the graphical process control loop display portion including graphical representations of one or more process plant entities selected from the plurality of process plant entities; generating, by the one or more processors, a selectable display list representing the one or more process plant entities depicted within the graphical process control loop display portion; transmitting, by the one or more processors, the graphical process control loop display portion and the selectable display list to a mobile user interface device, the mobile user interface device executing a mobile display navigation app rendering, by the mobile display navigation app, the selectable display list within a first area of a display screen of the mobile user interface device; and rendering, by the mobile display navigation app, the graphical process control loop display portion within a second area of the display screen of the mobile user interface device, wherein the mobile display navigation app is adapted to, upon receiving a selection from the selectable display list corresponding to a particular process plant entity of the or more process plant entities, adjust a zoom level to focus the particular process plant entity within the graphical process control loop display portion.

41. The GUI based method of aspect 40 further comprising: rendering, by the mobile display navigation app, a representation of one or more measurement parameters of the particular process plant entity on the display screen of the mobile user interface device.

42. The GUI based method of any one or more of aspects 40 to 41 further comprising: rendering, by the mobile display navigation app, a representation of one or more alarm indicators of the particular process plant entity on the display screen of the mobile user interface device.

43. The GUI based method of any one or more of aspects 40 to 42, wherein the graphical process control loop display portion corresponds to a process control module of the process plant.

44. The GUI based method of any one or more of aspects 40 to 43, further comprising automatically detecting, by the display auto-introspection routine, a second graphical process control loop display portion depicted within the full-size process plant display, the second graphical process control loop display portion including graphical representations of a second one or more process plant entities selected from the plurality of process plant entities; generating, by the one or more processors, a second selectable display list representing the second one or more process plant entities depicted within the second graphical process control loop display portion; and transmitting, by the one or more processors, the second graphical process control loop display portion and the second selectable display list to a mobile user interface device, wherein the mobile display navigation app is configured to toggle rendering of the graphical process control loop display portion and rendering of the second graphical process control loop display portion within the second area of the display screen of the mobile user interface device upon receiving a selection of the user from the display screen, wherein rendering of the graphical process control loop display portion causes rendering of the selectable display list in the first area, and wherein rendering of the second graphical process control loop display portion causes rendering of the second selectable display list in the first area.

45. The GUI based method of any one or more of aspects 40 to 44 further comprising: receiving a selection from the mobile user interface device, the selection corresponding to a process plant entity of the plurality of process plant entities, and wherein the selection initiates control of the process plant entity within the process plant.

46. A guided user interface (GUI) based system configured to automatically detect graphical process control loop display portions within full-size process plant displays for rendering on mobile user interface devices, the GUI based system comprising: a server comprising one or more processors, the server communicatively coupled to a process control network of a process plant comprising a plurality of process plant entities; a display auto-introspection routine executing the one or more processors of the server; and a mobile display navigation app executing on one or more processors of a mobile user interface device, the mobile display navigation app communicatively coupled to the server, wherein the display auto-introspection routine is configured to: receive a full-size process plant display that graphically represents at least a portion of the process plant, the full-size process plant display including graphic representations of the plurality of process plant entities within the process plant, wherein the full-size process plant display is a GUI adapted for rendering on a full-size display screen of the process plant, automatically detect a graphical process control loop display portion depicted within the full-size process plant display, the graphical process control loop display portion including graphical representations of one or more process plant entities selected from the plurality of process plant entities, generate a selectable display list representing the one or more process plant entities depicted within the graphical process control loop display portion, wherein the server is configured to transmit the graphical process control loop display portion and the selectable display list to a mobile user interface device, and wherein the mobile display navigation app is configured to: render the selectable display list within a first area of a display screen of the mobile user interface device, and render the graphical process control loop display portion within a second area of the display screen of the mobile user interface device, wherein the mobile display navigation app is adapted to, upon receiving a selection from the selectable display list corresponding to a particular process plant entity of the or more process plant entities, adjust a zoom level to focus the particular process plant entity within the graphical process control loop display portion.

47. The GUI based system of aspect 46 wherein the mobile display navigation app is configured to render a representation of one or more measurement parameters of the particular process plant entity on the display screen of the mobile user interface device.

48. The GUI based system of any one or more of aspects 46 to 47 wherein the mobile display navigation app is configured to render a representation of one or more alarm indicators of the particular process plant entity on the display screen of the mobile user interface device.

49. The GUI based system of any one or more of aspects 46 to 48, wherein the graphical process control loop display portion corresponds to a process control module of the process plant.

50. The GUI based system of any one or more of aspects 46 to 49, wherein the display auto-introspection routine is configured to automatically detecting a second graphical process control loop display portion depicted within the full-size process plant display, the second graphical process control loop display portion including graphical representations of a second one or more process plant entities selected from the plurality of process plant entities, wherein the one or more processors are configured to generate a second selectable display list representing the second one or more process plant entities depicted within the second graphical process control loop display portion, wherein the one or more processors are configured to transmit the second graphical process control loop display portion and the second selectable display list to a mobile user interface device, wherein the mobile display navigation app is configured to toggle rendering of the graphical process control loop display portion and rendering of the second graphical process control loop display portion within the second area of the display screen of the mobile user interface device upon receiving a selection of the user from the display screen, wherein rendering of the graphical process control loop display portion causes rendering of the selectable display list in the first area, and wherein rendering of the second graphical process control loop display portion causes rendering of the second selectable display list in the first area.

51. The GUI based system of any one or more of aspects 46 to 50 where the mobile display navigation app is configured to receive a selection from the mobile user interface device, the selection corresponding to a process plant entity of the plurality of process plant entities, and wherein the selection initiates control of the process plant entity within the process plant.

52. A tangible, non-transitory computer-readable medium storing instructions for automatically detecting graphical process control loop display portions within full-size process plant displays for rendering on mobile user interface devices, that when executed by one or more processors of a computing device cause the computing device to: receive, at a display auto-introspection routine executing on one or more processors, a full-size process plant display that graphically represents at least a portion of a process plant, the full-size process plant display including graphic representations of a plurality of process plant entities within the process plant, wherein the full-size process plant display is a GUI adapted for rendering on a full-size display screen of the process plant; detect automatically, by the display auto-introspection routine, a graphical process control loop display portion depicted within the full-size process plant display, the graphical process control loop display portion including graphical representations of one or more process plant entities selected from the plurality of process plant entities; generate, by the one or more processors, a selectable display list representing the one or more process plant entities depicted within the graphical process control loop display portion; transmit, by the one or more processors, the graphical process control loop display portion and the selectable display list to a mobile user interface device, the mobile user interface device executing a mobile display navigation app render, by the mobile display navigation app, the selectable display list within a first area of a display screen of the mobile user interface device; and render, by the mobile display navigation app, the graphical process control loop display portion within a second area of the display screen of the mobile user interface device, wherein the mobile display navigation app is adapted to, upon receiving a selection from the selectable display list corresponding to a particular process plant entity of the or more process plant entities, adjust a zoom level to focus the particular process plant entity within the graphical process control loop display portion Full-Size Process Plant Display Refactoring 53. A graphical user interface (GUI) based method for refactoring full-size process plant displays at various zoom and detail levels for visualization on mobile user interface devices, the GUI based method comprising: transmitting, by one or more processors, a full-size process plant display to a mobile user interface device, the full-size process plant display graphically representing at least a portion of a process plant, the full-size process plant display including graphic representations of a plurality of process plant entities within the process plant, wherein the a full-size process plant display is a GUI adapted for rendering on a full-size display screen of the process plant; rendering, by a mobile display navigation app executing on a processor of the mobile user interface device, a first view portion of the full-size process plant display on a display screen of the mobile user interface device, the first view portion defining a first zoom level and a first detail level of a process plant entity selected from the plurality of process plant entities, wherein the display screen of the mobile user interface device comprises a surface area that is less than a full-size surface area of the full-size display screen; receiving, at the mobile display navigation app, a gesture command corresponding to a user manipulation of the surface area of the mobile user interface device; and rendering, by the mobile display navigation app upon receiving the gesture command, a second view portion of the full-size process plant display on the display screen of the mobile user interface device, the second view portion defining a second zoom level and a second detail level of the process plant entity, wherein the first zoom level differs from the second zoom level, and wherein the first detail level differs from the second detail level.

54. The GUI based method of aspect 53, wherein the mobile display navigation app renders a focused view of the process plant entity at the second zoom level compared with the first zoom level, and wherein the mobile display navigation app renders, on the display screen of the mobile user interface device, detail information of the process plant entity at the second detail level.

55. The GUI based method of aspect 54, wherein the detail information includes at least one of an alarm adorner graphic or a measurement parameter of the process plant entity.

56. The GUI based method of aspect 54 to 55, wherein the information includes the alarm adorner graphic, and wherein mobile display navigation app renders the focused view when the alarm adorner graphic is triggered for display.

57. The GUI based method of any one or more of aspects 54 to 56, wherein the mobile display navigation app renders, on the display screen of the mobile user interface device, the detail information in real time or near-real time.

58. The GUI based method of any one or more of aspects 54 to 57, wherein the first view portion comprises a first graphic resolution and the second view portion comprises a second graphic resolution, the first graphic resolution being different from the second graphic resolution.

59. The GUI based method of any one or more of aspects 54 to 58, wherein the mobile display navigation app determines each of the first graphic resolution and the second graphic resolution based on a size of the display screen of the mobile user interface device.

60. The GUI based method of any one or more of aspects 54 to 59, wherein the full-size process plant display is comprised of a plurality of graphical view layers, wherein the first view portion associated with a first graphical layer having a first zoom range, and wherein the second view portion is associated with a second graphical layer having a second zoom range, and wherein the mobile display navigation app, upon receiving the gesture command, detects a transition from the first zoom range to the second zoom range, the transition causing the mobile display navigation app to render the second view portion at the second graphical layer.

61. The GUI based method of any one or more of aspects 54 to 60, further comprising receiving, at the one or more processors, a configuration command causing the one or more processors to execute instructions to implement one or more of the following: (a) predefine a graphic resolution of the first view portion or the second view portion, (b) modify the detail information, or (c) define a set of view layers associated with the first zoom level and the second zoom level.

62. The GUI based method of any one or more of aspects 54 to 61, wherein the full-size process plant display is a browser based display and the mobile display navigation app comprises a browser, wherein the browser renders the first view portion on the display screen of the mobile user interface device, wherein receiving the gesture command at the mobile display navigation app, causes the browser to execute instructions requesting electronic transmission of the detail information from a server associated with the process plant, and wherein the browser, upon receiving the detail information, renders the second view portion with the detail information.

63. The GUI based method of any one or more of aspects 54 to 62, wherein the mobile display navigation app comprises a native mobile app, wherein the native mobile app renders the first view portion on the display screen of the mobile user interface device, wherein receiving the gesture command at the mobile display navigation app, causes the native mobile app to execute instructions requesting electronic transmission of the detail information from a server associated with the process plant, and wherein the native mobile app, upon receiving the detail information, renders the second view portion with the detail information.

64. The GUI based method of any one or more of aspects 53 to 63, wherein the surface area of the display screen of the mobile user interface device is less than half the full-size surface area of the full-size display screen.

65. The GUI based method of any one or more of aspects 53 to 64, wherein each of the first view portion and the second view portion is sized to render fully on the display screen of the mobile user interface device.

66. The GUI based method of any one or more of aspects 53 to 65, wherein the full-size process plant display is a comprehensive representation of the process plant.

67. The GUI based method of any one or more of aspects 53 to 66, wherein the full-size process plant display natively integrated with a process control network of the process plant.

68. The GUI based method of any one or more of aspects 53 to 67 further comprising: receiving a selection from the mobile user interface device, the selection corresponding to the process plant entity of the plurality of process plant entities, and wherein the selection initiates control of the process plant entity within the process plant.

69. A graphical user interface (GUI) based system configured to refactor full-size process plant displays at various zoom and detail levels for visualization on mobile user interface devices, the GUI based system comprising: a server comprising one or more processors, the server communicatively coupled to a process control network of a process plant comprising a plurality of process plant entities; and a mobile display navigation app executing on one or more processors of a mobile user interface device, the mobile display navigation app communicatively coupled to the server, wherein the server is configured to transmit a full-size process plant display to the mobile user interface device, the full-size process plant display graphically representing at least a portion of the process plant, the full-size process plant display including graphic representations of the plurality of process plant entities within the process plant, wherein the a full-size process plant display is a GUI adapted for rendering on a full-size display screen of the process plant, wherein the display mobile navigation app is configured to: render, on a processor of the mobile user interface device, a first view portion of the full-size process plant display on a display screen of the mobile user interface device, the first view portion defining a first zoom level and a first detail level of a process plant entity selected from the plurality of process plant entities, wherein the display screen of the mobile user interface device comprises a surface area that is less than a full-size surface area of the full-size display screen, receive a gesture command corresponding to a user manipulation of the surface area of the mobile user interface device, and render, upon the mobile display navigation app receiving the gesture command, a second view portion of the full-size process plant display on the display screen of the mobile user interface device, the second view portion defining a second zoom level and a second detail level of the process plant entity, wherein the first zoom level differs from the second zoom level, and wherein the first detail level differs from the second detail level.

70. The GUI based system of aspect 69, wherein the mobile display navigation app renders a focused view of the process plant entity at the second zoom level compared with the first zoom level, and wherein the mobile display navigation app renders, on the display screen of the mobile user interface device, detail information of the process plant entity at the second detail level.

71. The GUI based system of any one or more of aspects 69 to 70, wherein the detail information includes at least one of an alarm adorner graphic or a measurement parameter of the process plant entity.

72. The GUI based system of any one or more of aspects 69 to 71, wherein the information includes the alarm adorner graphic, and wherein mobile display navigation app renders the focused view when the alarm adorner graphic is triggered for display 72. The GUI based system of aspect 71 to 72, wherein the mobile display navigation app renders, on the display screen of the mobile user interface device, the detail information in real time or near-real time.

73. The GUI based system of aspect 71 to 72, wherein the first view portion comprises a first graphic resolution and the second view portion comprises a second graphic resolution, the first graphic resolution being different from the second graphic resolution.

74. The GUI based system of aspect 73, wherein the mobile display navigation app determines each of the first graphic resolution and the second graphic resolution based on a size of the display screen of the mobile user interface device.

75. The GUI based system of any one or more of aspects 70 to 74, wherein the full-size process plant display is comprised of a plurality of graphical view layers, wherein the first view portion associated with a first graphical layer having a first zoom range, and wherein the second view portion is associated with a second graphical layer having a second zoom range, and wherein the mobile display navigation app, upon receiving the gesture command, detects a transition from the first zoom range to the second zoom range, the transition causing the mobile display navigation app to render the second view portion at the second graphical layer.

76. The GUI based system of any one or more of aspects 70 to 75, further comprising receiving, at the one or more processors, a configuration command causing the one or more processors to execute instructions to implement one or more of the following: (a) predefine a graphic resolution of the first view portion or the second view portion, (b) modify the detail information, or (c) define a set of view layers associated with the first zoom level and the second zoom level.

77. The GUI based system of any one or more of aspects 70 to 76, wherein the full-size process plant display is a browser based display and the mobile display navigation app comprises a browser, wherein the browser renders the first view portion on the display screen of the mobile user interface device, wherein receiving the gesture command at the mobile display navigation app, causes the browser to execute instructions requesting electronic transmission of the detail information from a server associated with the process plant, and wherein the browser, upon receiving the detail information, renders the second view portion with the detail information.

78. The GUI based system of any one or more of aspects 70 to 77, wherein the mobile display navigation app comprises a native mobile app, wherein the native mobile app renders the first view portion on the display screen of the mobile user interface device, wherein receiving the gesture command at the mobile display navigation app, causes the native mobile app to execute instructions requesting electronic transmission of the detail information from a server associated with the process plant, and wherein the native mobile app, upon receiving the detail information, renders the second view portion with the detail information.

79. The GUI based system of any one or more of aspects 69 to 78, wherein the surface area of the display screen of the mobile user interface device is less than half the full-size surface area of the full-size display screen.

80. The GUI based system of any one or more of aspects 69 to 79, wherein each of the first view portion and the second view portion is sized to render fully on the display screen of the mobile user interface device.

81. The GUI based system of any one or more of aspects 69 to 80, wherein the full-size process plant display is a comprehensive representation of the process plant.

82. The GUI based system of any one or more of aspects 69 to 81, wherein the full-size process plant display natively integrated with a process control network of the process plant.

83. The GUI based system of any one or more of aspects 69 to 82 the mobile display navigation app receives a selection from the mobile user interface device, the selection corresponding to the process plant entity of the plurality of process plant entities, and wherein the selection initiates control of the process plant entity within the process plant.

84. A tangible, non-transitory computer-readable medium storing instructions for refactoring full-size process plant displays at various zoom and detail levels for visualization on mobile user interface devices, that when executed by one or more processors of a computing device cause the computing device to: transmitting, by one or more processors, a full-size process plant display to a mobile user interface device, the full-size process plant display graphically representing at least a portion of a process plant, the full-size process plant display including graphic representations of a plurality of process plant entities within the process plant, wherein the a full-size process plant display is a GUI adapted for rendering on a full-size display screen of the process plant; rendering, by a mobile display navigation app executing on a processor of the mobile user interface device, a first view portion of the full-size process plant display on a display screen of the mobile user interface device, the first view portion defining a first zoom level and a first detail level of a process plant entity selected from the plurality of process plant entities, wherein the display screen of the mobile user interface device comprises a surface area that is less than a full-size surface area of the full-size display screen; receiving, at the mobile display navigation app, a gesture command corresponding to a user manipulation of the surface area of the mobile user interface device; and rendering, by a mobile display navigation app upon receiving the gesture command, a second view portion of the full-size process plant display on the display screen of the mobile user interface device, the second view portion defining a second zoom level and a second detail level of the process plant entity, wherein the first zoom level differs from the second zoom level, and wherein the first detail level differs from the second detail level. The foregoing aspects of the disclosure are exemplary only and not intended to limit the scope of the disclosure.

Moreover, the following additional considerations apply to the foregoing discussion. Throughout this specification, actions described as performed by any device or routine generally refer to actions or processes of a processor manipulating or transforming data according to machine-readable instructions. The machine-readable instructions may be stored on and retrieved from a memory device communicatively coupled to the processor. That is, methods described herein may be embodied by a set of machine-executable instructions stored on a computer readable medium (i.e., on a memory device), such as illustrated in FIGS. 1B and/or 1C. The instructions, when executed by one or more processors of a corresponding device (e.g., a server, a user interface device, etc.), cause the processors to execute the method. Where instructions, routines, modules, processes, services, programs, and/or applications are referred to herein as stored or saved on a computer readable memory or on a computer readable medium, the words "stored" and "saved" are intended to exclude transitory signals.

Further, while the terms "operator," "personnel," "person," "user," "technician," and like other terms are used to describe persons in the process plant environment that may use or interact with the systems, apparatus, and methods described herein, these terms are not intended to be limiting. Where a particular term is used in the description, the term is used, in part, because of the traditional activities in which plant personnel engage, but is not intended to limit the personnel that could be engaging in that particular activity.

Additionally, throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "identifying," "presenting," "causing to be presented," "causing to be displayed," "displaying," or the like may refer to actions or processes of a machine (e.g., a computer) that manipulates or transforms data represented as physical (e.g., electronic, magnetic, biological, or optical) quantities within one or more memories (e.g., volatile memory, non-volatile memory, or a combination thereof), registers, or other machine components that receive, store, transmit, or display information.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f) and/or pre-AIA 35 U.S.C. § 112, sixth paragraph.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed is:

1. A graphical user interface (GUI) based method for regionizing full-size process plant displays for rendering on mobile user interface devices, the GUI based method comprising:
receiving, at a regionizer application (app) executing on one or more processors, a full-size process plant display that graphically represents at least a portion of a process plant, the full-size process plant display including graphic representations of a plurality of process plant entities within the process plant, wherein the full-size process plant display is a GUI adapted for rendering on a full-size display screen of the process plant;
determining, by the regionizer app, one or more display regions of the full-size process plant display, each of the one or more display regions defining a view portion of the full-size process plant display, and each of the one or more display regions including at least one graphical representation of a process plant entity selected from the plurality of process plant entities;
transmitting, by the one or more processors, the one or more display regions to a mobile user interface device, the mobile user interface device executing a mobile display navigation app;
rendering, by the mobile display navigation app, each of the one or more display regions on a display screen of the mobile user interface device, wherein the display screen of the mobile user interface device comprises a surface area that is less than a full-size surface area of the full-size display screen;
automatically detecting, by a display auto-introspection routine executing on the one or more processors, a graphical process control loop display portion depicted within the full-size process plant display, wherein the determination of the one or more display regions comprises defining a particular display region as the graphical process control loop display portion;

generating, by the regionizer app or the mobile display navigation app, a selectable display list representing one or more process plant entities depicted within the graphical process control loop display portion;

rendering, by mobile display navigation app, the selectable display list within a first area of the display screen of the mobile user interface device; and rendering, by the mobile display navigation app, the graphical process control loop display portion within a second area of the display screen of the mobile user interface device, wherein the mobile display navigation app is adapted to, upon receiving a selection from the selectable display list corresponding to a particular process plant entity of the or more process plant entities, adjust a zoom level to focus the particular process plant entity within the graphical process control loop display portion.

2. The GUI based method of claim 1 further comprising:
rendering, by the mobile display navigation app, a representation of one or more measurement parameters of the particular process plant entity on the display screen of the mobile user interface device.

3. The GUI based method of claim 1 further comprising:
rendering, by the mobile display navigation app, a representation of one or more alarm indicators of the particular process plant entity on the display screen of the mobile user interface device.

4. A guided user interface (GUI) based method for automatically detecting graphical process control loop display portions within full-size process plant displays for rendering on mobile user interface devices, the GUI based method comprising:

receiving, at a display auto-introspection routine executing on one or more processors, a full-size process plant display that graphically represents at least a portion of a process plant, the full-size process plant display including graphic representations of a plurality of process plant entities within the process plant, wherein the full-size process plant display is a GUI adapted for rendering on a full-size display screen of the process plant;

automatically detecting, by the display auto-introspection routine, a graphical process control loop display portion depicted within the full-size process plant display, the graphical process control loop display portion including graphical representations of one or more process plant entities selected from the plurality of process plant entities;

generating, by the one or more processors, a selectable display list representing the one or more process plant entities depicted within the graphical process control loop display portion;

transmitting, by the one or more processors, the graphical process control loop display portion and the selectable display list to a mobile user interface device, the mobile user interface device executing a mobile display navigation app rendering, by the mobile display navigation app, the selectable display list within a first area of a display screen of the mobile user interface device; and rendering, by the mobile display navigation app, the graphical process control loop display portion within a second area of the display screen of the mobile user interface device, wherein the mobile display navigation app is adapted to, upon receiving a selection from the selectable display list corresponding to a particular process plant entity of the or more process plant entities, adjust a zoom level to focus the particular process plant entity within the graphical process control loop display portion.

5. The GUI based method of claim 4 further comprising:
rendering, by the mobile display navigation app, a representation of one or more measurement parameters of the particular process plant entity on the display screen of the mobile user interface device.

6. The GUI based method of claim 4 further comprising:
rendering, by the mobile display navigation app, a representation of one or more alarm indicators of the particular process plant entity on the display screen of the mobile user interface device.

7. The GUI based method of claim 4, wherein the graphical process control loop display portion corresponds to a process control module of the process plant.

8. The GUI based method of claim 4, further comprising automatically detecting, by the display auto-introspection routine, a second graphical process control loop display portion depicted within the full-size process plant display, the second graphical process control loop display portion including graphical representations of a second one or more process plant entities selected from the plurality of process plant entities;

generating, by the one or more processors, a second selectable display list representing the second one or more process plant entities depicted within the second graphical process control loop display portion; and transmitting, by the one or more processors, the second graphical process control loop display portion and the second selectable display list to a mobile user interface device, wherein the mobile display navigation app is configured to toggle rendering of the graphical process control loop display portion and rendering of the second graphical process control loop display portion within the second area of the display screen of the mobile user interface device upon receiving a selection of the user from the display screen, wherein rendering of the graphical process control loop display portion causes rendering of the selectable display list in the first area, and wherein rendering of the second graphical process control loop display portion causes rendering of the second selectable display list in the first area.

9. The GUI based method of claim 4 further comprising:
receiving a selection from the mobile user interface device, the selection corresponding to a process plant entity of the plurality of process plant entities, and wherein the selection initiates control of the process plant entity within the process plant.

10. A guided user interface (GUI) based system configured to automatically detect graphical process control loop display portions within full-size process plant displays for rendering on mobile user interface devices, the GUI based system comprising:

a server comprising one or more processors, the server communicatively coupled to a process control network of a process plant comprising a plurality of process plant entities;

a display auto-introspection routine executing the one or more processors of the server; and a mobile display navigation app executing on one or more processors of a mobile user interface device, the mobile display navigation app communicatively coupled to the server, wherein the display auto-introspection routine is configured to:

receive a full-size process plant display that graphically represents at least a portion of the process plant, the full-size process plant display including graphic representations of the plurality of process plant entities within the process plant, wherein the full-size process plant display is a GUI adapted for rendering on a full-size display screen of the process plant, automatically detect a graphical process control loop display portion depicted within the full-size process plant display, the graphical process control loop display portion including graphical representations of one or more process plant entities selected from the plurality of process plant entities, generate a selectable display list representing the one or more process plant entities depicted within the graphical process control loop display portion, wherein the server is configured to transmit the graphical process control loop display portion and the selectable display list to a mobile user interface device, and wherein the mobile display navigation app is configured to:

render the selectable display list within a first area of a display screen of the mobile user interface device, and render the graphical process control loop display portion within a second area of the display screen of the mobile user interface device, wherein the mobile display navigation app is adapted to, upon receiving a selection from the selectable display list corresponding to a particular process plant entity of the or more process plant entities, adjust a zoom level to focus the particular process plant entity within the graphical process control loop display portion.

11. The GUI based system of claim 10 wherein the mobile display navigation app is configured to render a representation of one or more measurement parameters of the particular process plant entity on the display screen of the mobile user interface device.

12. The GUI based system of claim 10 wherein the mobile display navigation app is configured to render a representation of one or more alarm indicators of the particular process plant entity on the display screen of the mobile user interface device.

13. The GUI based system of claim 10, wherein the graphical process control loop display portion corresponds to a process control module of the process plant.

14. The GUI based system of claim 10, wherein the display auto-introspection routine is configured to automatically detecting a second graphical process control loop display portion depicted within the full-size process plant display, the second graphical process control loop display portion including graphical representations of a second one or more process plant entities selected from the plurality of process plant entities, wherein the one or more processors are configured to generate a second selectable display list representing the second one or more process plant entities depicted within the second graphical process control loop display portion, wherein the one or more processors are configured to transmit the second graphical process control loop display portion and the second selectable display list to a mobile user interface device, wherein the mobile display navigation app is configured to toggle rendering of the graphical process control loop display portion and rendering of the second graphical process control loop display portion within the second area of the display screen of the mobile user interface device upon receiving a selection of the user from the display screen, wherein rendering of the graphical process control loop display portion causes rendering of the selectable display list in the first area, and wherein rendering of the second graphical process control loop display portion causes rendering of the second selectable display list in the first area.

15. The GUI based system of claim 10, where the mobile display navigation app is configured to receive a selection from the mobile user interface device, the selection corresponding to a process plant entity of the plurality of process plant entities, and wherein the selection initiates control of the process plant entity within the process plant.

16. A tangible, non-transitory computer-readable medium storing instructions for automatically detecting graphical process control loop display portions within full-size process plant displays for rendering on mobile user interface devices, that when executed by one or more processors of a computing device cause the computing device to:

receive, at a display auto-introspection routine executing on one or more processors, a full-size process plant display that graphically represents at least a portion of a process plant, the full-size process plant display including graphic representations of a plurality of process plant entities within the process plant, wherein the full-size process plant display is a GUI adapted for rendering on a full-size display screen of the process plant;

detect automatically, by the display auto-introspection routine, a graphical process control loop display portion depicted within the full-size process plant display, the graphical process control loop display portion including graphical representations of one or more process plant entities selected from the plurality of process plant entities;

generate, by the one or more processors, a selectable display list representing the one or more process plant entities depicted within the graphical process control loop display portion;

transmit, by the one or more processors, the graphical process control loop display portion and the selectable display list to a mobile user interface device, the mobile user interface device executing a mobile display navigation app render, by the mobile display navigation app, the selectable display list within a first area of a display screen of the mobile user interface device; and render, by the mobile display navigation app, the graphical process control loop display portion within a second area of the display screen of the mobile user interface device, wherein the mobile display navigation app is adapted to, upon receiving a selection from the selectable display list corresponding to a particular process plant entity of the or more process plant entities, adjust a zoom level to focus the particular process plant entity within the graphical process control loop display portion.

* * * * *

UNITED STATES PATENT AND TRADEMARK OFFICE
CERTIFICATE OF CORRECTION

PATENT NO. : 11,977,717 B2
APPLICATION NO. : 17/982107
DATED : May 7, 2024
INVENTOR(S) : Cristopher Ian Sarmiento Uy et al.

It is certified that error appears in the above-identified patent and that said Letters Patent is hereby corrected as shown below:

In the Drawings

At Fig. 1A, Sheet 1 of 14, Tag "78", Line 1, "GETEWAY" should be -- GATEWAY --.

At Fig. 4, Sheet 7 of 14, Tag "404", Line 1, "Regionzier" should be -- Regionizer --.

In the Specification

At Column 1, Line 11, "2019," should be -- 2019, now U.S. Pat. No. 11,507,251, --.

At Column 3, Line 33, "such standard" should be -- such as standard --.

At Column 3, Line 61, "of standard of standard" should be -- of standard --.

At Column 6, Line 10, "the or more" should be -- the one or more --.

At Column 6, Line 58, "need be" should be -- need to be --.

At Column 7, Line 21, "maintain" should be -- to maintain --.

At Column 7, Lines 60-61, "such mobile" should be -- such as mobile --.

At Column 7, Line 61, "describe" should be -- described --.

At Column 9, Line 20, "table," should be -- tablet, --.

At Column 15, Line 20, "as over" should be -- over --.

Signed and Sealed this
Tenth Day of February, 2026

John A. Squires
*Director of the United States Patent and Trademark Office*

CERTIFICATE OF CORRECTION (continued)
U.S. Pat. No. 11,977,717 B2

At Column 15, Line 37, "(RESTful)" should be -- (REST) --.

At Column 15, Line 41, "originated" should be -- originate --.

At Column 16, Line 40, "sever" should be -- server --.

At Column 17, Line 11, "and/or or" should be -- and/or --.

At Column 17, Line 67, "and/or or" should be -- and/or --.

At Column 18, Line 3, "and/or or" should be -- and/or --.

At Column 18, Line 3, "times)" should be -- times --.

At Column 21, Line 24, "of the of the" should be -- of the --.

At Column 21, Line 28, "of the of" should be -- of the --.

At Column 21, Line 61, "such mobile" should be -- such as mobile --.

At Column 21, Line 61, "describe" should be -- described --.

At Column 22, Line 10, "302n1 and 302n1" should be -- 302n1 and 302n2 --.

At Column 23, Line 31, "such" should be -- much --.

At Column 24, Line 34, "such CPU" should be -- such as CPU --.

At Column 26, Line 26, "one more" should be -- one or more --.

At Column 27, Line 11, "operates the" should be -- operates in the --.

At Column 27, Line 62, "such any" should be -- such as any --.

At Column 28, Line 45, "operates the" should be -- operates in the --.

At Column 30, Line 33, "describe" should be -- described --.

At Column 31, Line 5, "the or more" should be -- the one or more --.

At Column 31, Line 7, "e.g.," should be -- (e.g., --.

At Column 31, Line 29, "provided" should be -- provided by --.

CERTIFICATE OF CORRECTION (continued)
U.S. Pat. No. 11,977,717 B2

At Column 33, Line 2, "such mobile" should be -- such as mobile --.

At Column 33, Line 3, "describe" should be -- described --.

At Column 34, Line 29, "range second" should be -- range and second --.

At Column 35, Line 1, "and/or or" should be -- and/or --.

At Column 35, Line 32, "the a" should be -- the --.

At Column 35, Line 35, "10)" should be -- 10). --.

At Column 37, Line 19, "one more" should be -- one or more --.

At Column 39, Lines 5-6, "the or more" should be -- the one or more --.

At Column 39, Line 60, "one more" should be -- one or more --.

At Column 41, Line 54, "the or more" should be -- the one or more --.

At Column 43, Line 8, "the or more" should be -- the one or more --.

At Column 44, Line 26, "the or more" should be -- the one or more --.

At Column 44, Line 29, "portion" should be -- portion. --.

At Column 44, Line 40, "the a" should be -- the --.

At Column 46, Line 40, "the a" should be -- the --.

At Column 47, Line 9, "display" should be -- display. --.

At Column 48, Line 33, "the a" should be -- the --.

In the Claims

At Column 51, Line 18, "the or more" should be -- the one or more --.

At Column 51, Line 60, "app" should be -- app; --.

At Column 52, Line 4, "the or more" should be -- the one or more --.

At Column 53, Line 33, "the or more" should be -- the one or more --.

At Column 54, Line 51, "app" should be -- app; --.

At Column 54, Line 62, "the or more" should be -- the one or more --.